(12) United States Patent
Savage et al.

(10) Patent No.: US 9,948,689 B2
(45) Date of Patent: Apr. 17, 2018

(54) ONLINE SOCIAL PERSONA MANAGEMENT

(71) Applicant: Intel Corporation, Santa Clara, CA (US)

(72) Inventors: Norma Saiph Savage, Hillsboro, OR (US); Rita H. Wouhaybi, Portland, OR (US); Lama Nachman, Santa Clara, CA (US); Saurav Sahay, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 479 days.

(21) Appl. No.: 14/232,706

(22) PCT Filed: Jun. 27, 2013

(86) PCT No.: PCT/US2013/048268
§ 371 (c)(1),
(2) Date: Jan. 14, 2014

(87) PCT Pub. No.: WO2014/193424
PCT Pub. Date: Dec. 4, 2014

(65) Prior Publication Data
US 2014/0379729 A1    Dec. 25, 2014

Related U.S. Application Data

(60) Provisional application No. 61/829,805, filed on May 31, 2013.

(51) Int. Cl.
*G06F 17/30* (2006.01)
*H04L 29/06* (2006.01)
(Continued)

(52) U.S. Cl.
CPC .......... *H04L 65/403* (2013.01); *G06Q 10/10* (2013.01); *G06Q 50/01* (2013.01); *H04L 51/14* (2013.01); *H04L 51/32* (2013.01)

(58) Field of Classification Search
CPC ......... G06F 17/30867; G06F 17/30598; G06F 17/30643; G06F 17/30864; H04L 67/306; H04L 51/26; H04L 65/403
See application file for complete search history.

(56) References Cited

U.S. PATENT DOCUMENTS

| | | | |
|---|---|---|---|
| 7,974,940 B2* | 7/2011 | Ayloo | G06Q 10/10 707/608 |
| 8,375,024 B2* | 2/2013 | Goeldi | G06Q 10/00 707/709 |

(Continued)

FOREIGN PATENT DOCUMENTS

| | | |
|---|---|---|
| KR | 2010-0108589 | 10/2010 |
| KR | 2012-0087279 | 8/2012 |

(Continued)

OTHER PUBLICATIONS

International Search Report and Written Opinion received for PCT Patent Application PCT/US2013/048268, dated Feb. 27, 2014, 10 pages.

(Continued)

*Primary Examiner* — Debbie Le
(74) *Attorney, Agent, or Firm* — Barnes & Thornburg LLP

(57) ABSTRACT

Embodiments utilize a framework for modeling user's social roles in online self-expression tools such as blog or social networking, via semantic modeling techniques. The different ways users engage with content when stating explicit interests in their profile and via social expressions in a community are modeled. Certain themes guide the patterns users follow for expressing their interests in this community. An embodiment allows users to track how their posts and comments reflect with their online behavior. An embodiment infers the needs of the online community and makes sug- (Continued)

gestions or recommendations or sends alerts to users. Other embodiments are described and claimed.

17 Claims, 15 Drawing Sheets

(51) Int. Cl.
*G06Q 50/00* (2012.01)
*G06Q 10/10* (2012.01)
*H04L 12/58* (2006.01)

(56) References Cited

U.S. PATENT DOCUMENTS

| | | | |
|---|---|---|---|
| 9,152,722 B2* | 10/2015 | Sahni | G06F 17/30867 |
| 9,299,060 B2* | 3/2016 | Panzer | G06Q 10/10 |
| 2005/0171799 A1 | 8/2005 | Hill et al. | |
| 2006/0282303 A1 | 12/2006 | Hale et al. | |
| 2008/0214148 A1 | 9/2008 | Ramer et al. | |
| 2010/0185935 A1 | 7/2010 | Yang et al. | |
| 2010/0211863 A1 | 8/2010 | Jones et al. | |
| 2011/0179114 A1* | 7/2011 | Dilip | G06F 17/30867 709/204 |
| 2011/0191372 A1 | 8/2011 | Kaushansky et al. | |
| 2011/0196927 A1* | 8/2011 | Vance | G06Q 30/02 709/204 |
| 2012/0066073 A1* | 3/2012 | Dilip | G06Q 30/0269 705/14.66 |
| 2012/0179751 A1 | 7/2012 | Ahn et al. | |
| 2013/0054708 A1 | 2/2013 | Bhatt et al. | |
| 2014/0012918 A1* | 1/2014 | Chin | G06Q 50/01 709/204 |
| 2015/0127748 A1* | 5/2015 | Buryak | G06F 17/30867 709/206 |

FOREIGN PATENT DOCUMENTS

| | | |
|---|---|---|
| KR | 2013-0006418 A | 1/2013 |
| KR | 10-2013-0045425 A | 5/2013 |
| KR | 2013-0045425 | 5/2013 |

OTHER PUBLICATIONS

Agarwal et al., "Identifying the Influential Bloggers in a Community", In Proceedings of the 2008 International Conference on Web Search and Data Mining, WSDM '08, ACM, New York, USA, published in 2008, pp. 207-218.

Allan, J. "Topic Detection and Tracking: Event-Based Information Organization", vol. 12. Springer, 2002.

Back et al., "Facebook Profiles Reflect Actual Personality, not Self-Idealization", Psychological science, vol. 21, No. 3, 2010, pp. 372-374.

Blei et al., "Latent Dirichlet Allocation", Journal of machine Learning research 3, published in 2003, pp. 993-1022.

Bollacker et al., "Freebase: A Collaboratively Created Graph Database for Structuring Human Knowledge", In Proceedings of the 2008 ACM SIGMOD international conference on Management of data, SIGMOD, ACM, New York, USA, published in 2008, pp. 1247-1249.

Bond et al., "A 61-Million-Person Experiment in Social Influence and Political Mobilization", Nature 489, Sep. 13, 2012, 7 pages.

Carney et al., "The Secret Lives of Liberals and Conservatives: Personality Profiles, Interaction Styles, and The Things They Leave Behind", Political Psychology, vol. 29, No. 6, published in 2008, pp. 807-840.

Cataldi et al., "Emerging Topic Detection on Twitter Based on Temporal and Social Terms Evaluation". In Proceedings of the Tenth International Workshop on Multimedia Data Mining, ACM, published in 2010, 10 pages.

Hal Daume' III, "Markov Random Topic Fields", Aug. 4, 2009, pp. 293-296.

Dietz et al., "De-Layering Social Networks by Shared Tastes of Friendships", In Proceedings of the Sixth International AAAI Conference on Weblogs and Social Media, ICWSM, Published in 2012, pp. 443-446.

Ellison et al., "Managing Impressions Online: Self-Presentation Processes in the Online Dating Environment", Journal of Computer-Mediated Communication 11, published in Jan. 2006, pp. 415-441.

Seth Fiegerman, "How Facebook Graph Search Could Disrupt Online Dating", Jan. 2013, 5 pages.

Erving Goffman, "The Presentation of Self in Everyday Life", Published in Jun. 1959, 2 pages.

Gosling, S. D. Snoop: "What Your Stuff Says About You", First trade paper edition ed. Basic Books, May 2009.

Gosling et al., "A Room with a Cue: Personality Judgments Based on Offices and Bedrooms", Journal of personality and social psychology, vol. 82, No. 3, published in 2002, pp. 379-398.

Heckner et al., "Personal Information Management Vs. Resource Sharing: Towards a Model of Information Behavior in Social Tagging Systems", In Proceedings the Third International ICWSM Conference, published in 2009, pp. 42-49.

Java et al., "Why We Twitter: Understanding Microblogging Usage and Communities", In Proceedings of the 9th WEBKDD and 1st SNA-KDD workshop' 07 on Web mining and social network analysis, ACM, New York, USA, published in 2007, pp. 56-65.

Kaye et al., A Web for All Reasons: Uses and Gratifications of Internet Components for Political Information, Telematics and Informatics, vol. 21, No. 3, 2004, pp. 197-223.

Emre Kiciman, "Omg, I Have to Tweet That! A Study of Factors that Influence Tweet Rates", In Proceedings of the Sixth AAAI Conference on Weblogs and Social Media, published in 2012, pp. 170-177.

Kittur et al., "Crowdsourcing User Studies With Mechanical Turk", In Proceedings of the twenty-sixth annual SIGCHI conference on Human factors in computing systems, CHI '08, published on Apr. 5, 2008, pp. 453-456.

Phyllis Korkki, "Is Your Online Identity Spoiling Your Chances?", published on Oct. 9, 2010, 4 pages.

Viktor Mayer-Schönberger, "Delete: The Virtue of Forgetting in the Digital Age". Princeton University Press, 2009.

Michelson et al., "Discovering Users' Topics of Interest on Twitter: A First Look" In Proceedings of the fourth workshop on Analytics for noisy unstructured text data, ACM, New York, USA, published on Oct. 26, 2010, pp. 73-79.

George A. Miller, "Wordnet: A Lexical Database for English", Communications of the ACM, vol. 38, No. 11, Published in Nov. 1995, pp. 39-41.

Morgan et al., "Tea and Sympathy: Crafting Positive New User Experiences on Wikipedia". In proceedings of the 2013 conference on Computer supported cooperative work-CSCW, published in 2013, pp. 839-848.

Naaman et al., "Is It Really About Me?: Message Content in Social Awareness Streams". In Proceedings of the 2010 ACM conference on Computer supported cooperative work, CSCW 2010, published in 2010, pp. 189-192.

Nori et al., "Exploiting User Interest on Social Media for Aggregating Diverse Data and Predicting Interest", published in 2011, pp. 241-248.

Parikh et al., "Relative Attributes", In Proceedings the International Conference on computer Vision (ICCV), published in 2011, pp. 503-510.

Ashley Parker, "Congressman, Sharp Voice on Twitter, Finds It Can Cut 2 Ways", published on May 30,2011, 3 pages.

Pennacchiotti et al., "Democrats, Republicans and Starbucks Afficionados: User Classification in Twitter". In Proceedings of the 17th ACM SIGKDD international conference on Knowledge discovery and data mining, KDD, Aug. 21-24, 2011, pp. 430-438.

Quercia et al., "TweetLDA: Supervised Topic Classification and Link Prediction in Twitter". In Proceedings of the 3rd Annual ACM Web Science Conference, WebSci '12, ACM, published in 2012, pp. 247-250.

(56) References Cited

OTHER PUBLICATIONS

Ramage et al., "Characterizing Microblogs With Topic Models", In Proceedings of the Fourth International AAAI Conference on Weblogs and Social Media, AAAI, published in 2010, pp. 130-137.
Rentfrow et al., "The Do Re Mi's of Everyday Life: The Structure and Personality Correlates of Music Preferences" Journal of personality and social psychology, vol. 84, No. 6, published in Jun. 2003, pp. 1236-1256.
Gideon Schwarz, "Estimating the Dimension of a Model", The Annals of Statistics, vol. 6, No. 2, published in 1978, pp. 461-464.
Dennis Wilkinson, "Strong Regularities in Online Peer Production", In Proceedings of the 9th ACM conference on Electronic commerce, EC '08, ACM, Jul. 8-12, 2008, pp. 302-309.
Wu et al. "Topic Detection in Online Discussion using Non-Negative Matrix Factorization", In Proceedings of the 2007 IEEE/WIC/ACM International Conferences on Web Intelligence and Intelligent Agent Technology—Workshops, WI-IATW '07, IEEE Computer Society, Washington, DC, USA, 2007, pp. 272-275.
Yang et al., "Patterns of Temporal Variation in Online Media", In Proceedings of the fourth ACM international conference on Web search and data mining, WSDM '11, ACM, Feb. 9-12, 2011, pp. 177-186.
Abel et al., "Cross-system user modeling and personalization on the Social Web", User Model User-Adap Inter (2013), published online Nov. 1, 2012, pp. 169-209.
Jain et al., "Finding Nemo: Searching and Resolving Identities of Users Across Online Social Networks", Indraprastha Institute of Information Technology (IIIT-Delhi), India, Dec. 26, 2012, 10 pages.
Malhotra et al., "Studying User Footprints in Different Online Social Networks", Indraprastha Institute of Information Technology, New Delhi, India, Jan. 29, 2013, 7 pages.
Iofciu et al., "Identifying Users Across Social Tagging Systems", Proceedings of the Fifth International AAAI Conference on Weblogs and Social Media, 2011, pp. 523-525.
Korayem et al., "De-anonymizing Users Across Heterogeneous Social Computing Platforms", 7 international AAAI conference on weblogs and social media, ICWSM, 2013, pp. 1-4.
Rodrigues et al., "uTrack: Track Yourself! Monitoring Information on Online Social Media", Source: WWW (Companion Volume), 2013, 4 pages.
Goga et al., "Exploiting Innocuous Activity for Correlating Users Across Sites", Proceedings of the 22nd international conference on World Wide Web, 2013, 11 pages.
Goga et al., "Large-scale Correlation of Accounts Across Social Networks", University of California at Berkeley, TR-13-002, Apr. 2013, 21 pages.
Hauff et al., "Brave New Task: User Account Matching", MediaEval 2012 Workshop, Oct. 4-5, 2012, 2 pages.
Liu et al., "What's in a Name? An Unsupervised Approach to Link Users across Communities", WSDM'13, Feb. 4-8, 2013, Rome, Italy, pp. 495-504.
Guy et al., "Mining Expertise and Interests from Social Media", International World Wide Web Conference Committee (IW3C2), May 13-17, 2013, pp. 1-11.
Amershi et al., "ReGroup: Interactive Machine Learning for On-Demand Group Creation in Social Networks", Computer Science & Engineering, DUB Group, May 5-10, 2012, 10 pages.
Reasons for Rejection and English Translation for Korean Patent Application No. 2015-7031175, dated Aug. 12, 2016, 19 pages.
European Search Report for Application No. 13886067.1-1958, dated Jan. 16, 2017, 11 pages.
Notice of Preliminary Rejection and English Translation for Korean Patent Application No. 2015-7031175, dated Feb. 23, 2017, 18 pages.

\* cited by examiner

Table 1. Statistics of Ontd_political.

| | |
|---|---|
| Number of users | 1,972 |
| Number of posts | 1,200 |
| Number of comments | 30,934 |
| % of users creating posts (Posters) | 15 |
| Average number of posts Posters created in 4 months | 5 |
| Total number of unique words used for tagging posts | 1,622 |
| Average number of tags per post | 8 |
| % of users creating comments (Commenters) | 100 |
| Average number of comments created per user in 4 months | 36 |
| Average number of unique posts users commented on in 4 months | 24 |
| % of users with stated interests | 82 |
| Total number of unique interest tags used | 39,241 |
| Average number of interest tags per user profile | 50 |

*FIG. 9*

Table 2. Sample of stated interests and posts relevant to a topic of conversation. This table provides a qualitative outlook on the type of thematic posts and interest tags present in the omd_political community

| Theme | Stated Interests | Posts |
| --- | --- | --- |
| Sexual Identity | "noir", "bondage", "erotica", "love", "roleplaying", "earths children", "unresolved sexual tension", "yaoi", "bdsm" | "Remember girls having sex makes you nothing but dirty water", "Adam Lee Brown HIV-positive sex offender assaulted boy at Wendy's bathroom" |
| Health care | "Crohns Disease", "Herbalism", "Osteology", "Disability", "Scrubs" | "Romney booed by NAACP as he jabs Obama health care", "Democrats plan to back Obamacare repeal" |
| Racism | "African American Literature", "Rednecks", "Ippy", "Racial Inequality", "Race Relations" | "I don't feel bad for black people anymore because I think a black person stole my bike", "Florida fire captain: Trayvon died because of sh*tbag welfare dependent" |
| Church | "Amish", "Church Music", "House of Lords", "Anton Lavey", "Church of the Subgenius" | "Ontario Catholic school funding is unpopular, but a political non-starter", "Canada bishops Ban HPV Vaccine for catholic School Girls" |
| LGBT | "Homoeroticism", "John Greyson", "Homosex", "Bisexuality" | "Court prohibits all gay pride parades in Moscow for next 100 years", "Queer to the Core" |
| Women | "Feminist", "Jewish Feminism", "Bitch", "Tristan Taormino" | "Democrats Introduce WORK Act in Congress to Support Mitt Romney's Love of Stay At Home Moms", "Conservative Women's Group Takes Out Massive Ad Buy Against Obama" |
| Terrorism | "Terrorism", "Iraq", "Misanthropy", "Genocide" | "FBI Terror Plot: How the Government is Destroying the Lives of Innocent People", "Have an Arab-looking name?" No bank account for you!" |
| Political Science | "That's my Bush", "Franklin Pierce", "David Cameron", Michael Gove" | "Romney booed by NAACP as he jabs Obama health care", "Democrats plan to back Obamacare repeal" |

*FIG. 10*

ONLINE SOCIAL PERSONA MANAGEMENT

TECHNICAL FIELD

The present disclosure relates generally to the field of online social media and, more specifically, to managing online social personas and profiles of users in online communities.

BACKGROUND

A great portion of previous research work has focused on the task of automatically inferring user characteristics through various data mining techniques See, for instance, Pennacchiotti, M., & Popescu, A. (2011), *Democrats, republicans and starbucks afficionados: User classification in twitter, Proceedings of the 17th ACM SIGKDD International Conference on Knowledge Discovery and Data Mining*, 430-438; Ramage, D., Dumais, S., & Liebling, D. (2010), *Characterizing Microblogs with Topic Models, Conference on Weblogs and Social Media*, AAAI; and Yang, J., and Leskovec, J., *Patterns of temporal variation in online media, Proceedings of the fourth ACM international conference on Web search and data mining*, WSDM '11, ACM (New York, N.Y., USA, 2011), 177-186.

Little attention, however, has been devoted to bringing value to the user through meaningful recommendations, such as social roles users may assume in a conversation to reach a desired goal, or conversations a user might help based on the user's expertise.

Existing or proposed social recommender systems have focused on identifying online content that could be of interest to the user, see e.g. Google Alerts; or finding other users with whom to share online content, see e.g., Amershi, S., Fogarty, J., Weld, D. S. *ReGroup: Interactive Machine Learning for On Demand Group Creation in Social Networks, Proceedings CHI '12*, ACM Press 2012, Bernstein, M., Marcus, A., Karger, D., Miller R., *Enhancing directed content sharing, on the web, Proceedings of the SIGCHI Conference on Human Factors in Computing Systems*. ACM, New York, N.Y., USA, 2010.

BRIEF DESCRIPTION OF THE DRAWINGS

The features and advantages of embodiments disclosed herein will become readily understood by the following detailed description, in conjunction with the accompanying drawings. Like numerals having different letter suffixes may represent different instances of similar components. The drawings illustrate generally, by way of example, but not by way of limitation, various embodiments discussed in the present document.

FIG. 9 is Table 1 showing statistics from the author's dataset in Ontd_political, according to an experiment of one embodiment.

FIG. 10 is Table 2 showing a sample of stated interests and posts relevant to a topic of conversation, according to an experiment of one embodiment.

DETAILED DESCRIPTION

Figure 1A:
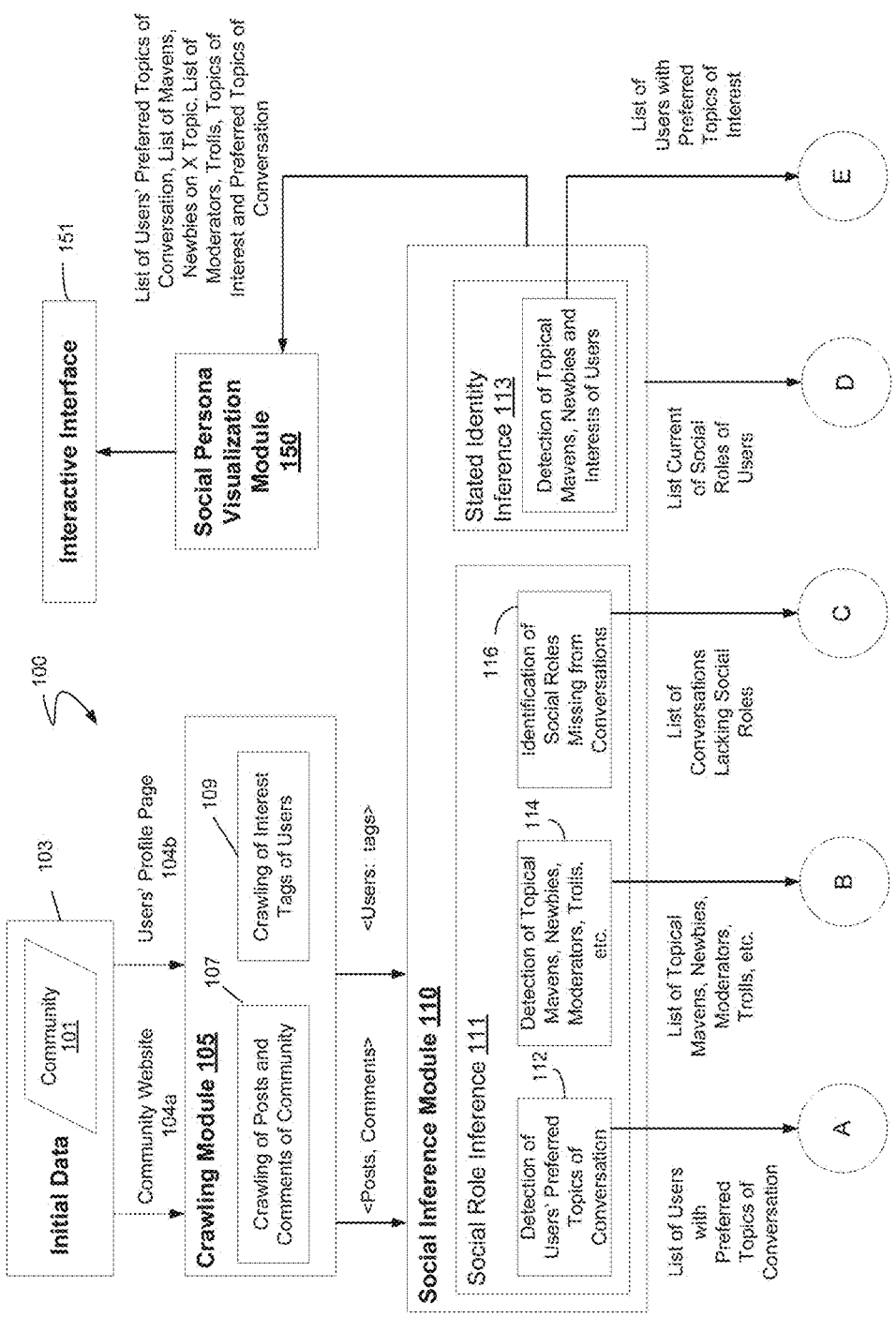
FIGS. 1A-B are a block diagram illustrating an example overview of a social persona management system, according to an embodiment.

In the following detailed description, reference is made to the accompanying drawings which form a part of the detailed description, wherein like numerals designate like parts throughout, and in which is shown by way of illustration embodiments that may be practiced. These embodiments may also be referred to herein as "examples." Such examples may include elements in addition to those shown or described. However, the authors also contemplate examples in which only those elements shown or described are provided. Moreover, the authors also contemplate examples using any combination or permutation of those elements shown or described (or one or more aspects thereof), either with respect to a particular example (or one or more aspects thereof), or with respect to other examples (or one or more aspects thereof) shown or described herein.

It is to be understood that other embodiments or examples may be utilized and structural or logical changes may be made without departing from the scope of the present disclosure. Therefore, the following detailed description is not to be taken in a limiting sense, and the scope of embodiments is defined by the appended claims and their equivalents.

An embodiment is a system, method and one or more computer readable media relating to managing user social personas, profiles and projected image within one or more online communities or social media systems.

Reference in the specification to "one embodiment," "an embodiment" or "an example" means that a particular feature, structure or characteristic described in connection with the embodiment or example is included in at least one embodiment as described herein. Thus, the appearances of the phrase "in one embodiment" appearing in various places throughout the specification are not necessarily all referring to the same embodiment.

For purposes of explanation, specific configurations and details are set forth in order to provide a thorough understanding of the embodiments disclosed herein. However, it will be apparent to one of ordinary skill in the art that embodiments may be practiced without the specific details presented herein. Furthermore, well-known features may be omitted or simplified in order not to obscure understanding of the description herein. Various examples may be given throughout this description. These are merely descriptions of specific embodiments. The scope of the claims is not limited to the exact examples given.

Most of the existing research and social media systems fail to suggest to users the type of contribution they might be able to make to a community, based on the community's needs or the user's overall goals. Facebook® for example, allows users to view or comment on posts by "friends" based on the friendship relationship, but there is no recommendation on the type of social role the user should assume in the conversation, or the type of contribution the user should make, to fulfill a personal goal.

Online systems such as Google® Alerts, Alltop, Monitter, TweetDeck, BackType, and PostRank Analytics may monitor millions of blogs (web logs), twitter conversations and news sites, and help users follow conversations of their topic of interest online. However, existing systems do not analyze a user's individual posts and behavior in order to help the user identify opportunities that would highlight the user's uniqueness through expertise or social roles.

Embodiments herein describe a system to infer the needs of a community and the needs of its users, and how to utilize this information to provide social recommendations. Social recommendations may inform users of conversations they might find interesting based on the conversation's topic of discussion, or the users' social connections, and also may inform users of the social roles they might assume in the conversation to help the discussion. Further, social recommendations may be provided to help users achieve one or more defined/desired goal. Embodiments described may improve management of online social roles and personas because existing systems do not recommend social roles the user could assume in a conversation to better the discussion. Embodiments may also analyze user behavior in a discussion to provide helpful profile augmentation suggestions. Embodiments may also send alerts to users when the user behavior in the discussion is derailing/helping the user achieve their goals.

Completing and maintaining an accurate online profile for presenting oneself to others can be time consuming, and complicated, and often very difficult; one might not be aware of all their expertise when compared to others. An embodiment herein describes a system and method for profile augmentation recommendation to assist with user profiles.

Online discussions may also benefit from the contributions of certain social roles, such as Moderators or Mavens. But, existing systems do not automatically identify needs for such contributors and the correct, or best, candidates. An embodiment herein describes a system and method to assist in role identification and recommendation.

Users may have one or more defined goals. For instance, a user may wish to attain a goal of promoting their expertise in topic X. Using existing systems to find online opportunities to reach a goal can be difficult and time consuming. An embodiment herein describes a system and method to enable goal attainment through recommendations and profile and persona management. Many users who prepare social goals for themselves may find it difficult to foresee that some of their actions in an online discussion could affect the achievement of their personal social goals (help or hurt).

Embodiments described herein may mitigate the problems mentioned above in order to help users better present themselves, analyzing their behavior and optimize their interactions in online communities.

An embodiment may take the textual information from conversations of an online community and the profiles of participants, to infer the typical social roles users assume within the conversation or community at large (such as Moderator, Maven, Troll, Newbie, or other use/administrator defined roles); the topical conversations in which users prefer to participate; and the social roles that are lacking in the discussions. An embodiment may then use this inferred information to provide social recommendations and introspection, such as:

Recommend to users elements to add to their online profile, such as, expertise or interest for certain topics.

Recommend a conversation and social role to assume, to a user based on his/her experience in handling the social role the conversation needs.

Recommend a conversation and social role to assume, to a user whose social goal is to fulfill the social role the conversation needs.

Recommend an online community and social roles to assume, to a user or to members from other online communities whose social goals are to fulfill the social roles the community needs or have experience in the social roles the community requires.

Alert users when their behavior is helping/harming the achievement of their goals, e.g., the user is acting as a Troll, but his/her goal is to be Moderator, or the user is acting as a Newbie in X topic, but his/her goal is to act as a Maven in X topic.

Provide users with a transparent introspective interface, where users can visualize the different.

social personas they have assumed based on the content they have posted in a community; enable users to analyze their data in different levels (overall view of the different social personas assumed, as well as how each specific snippet of data contributes to the overall social persona created); enable users to delete/edit their content and view how this affects the social personas they create within the community.

Enable users to teach the system how certain data is related to certain online social personas; provide to users new classifications and visualizations of their data based on the social rules learned by the system; allow users to explore and introspect their data based on these new classifications.

An embodiment may include four (4) components: a crawling module, a social inference module, a social recommendation module, and a social persona visualization module, to be discussed more fully below. It will be understood that the modules are logic may be implemented in a hardware component or device, software or firmware running on a processor, or a combination. The modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

Figure 1B:
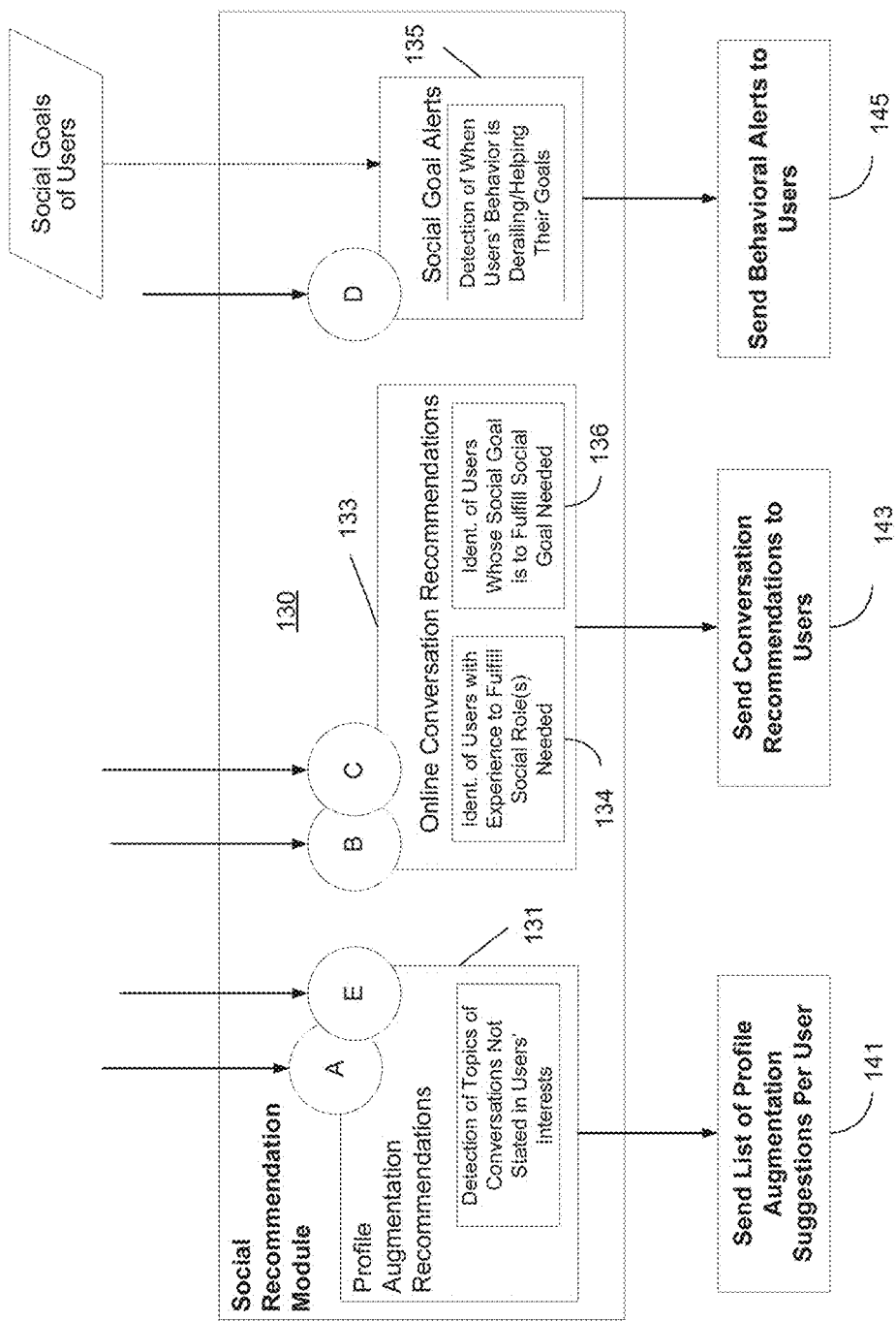

Referring to FIGS. 1A-B, there is shown a block diagram illustrating management of an online community and an example overview of a social persona management system 100, according to an embodiment. An online community 101 has associated initial data 103 which may include information about a community website, blackboard, discussion group, twitter feed. Facebook comment thread, or the like, 104a, as well as data 104b representing user profiles.

A Crawling Module 105 may be configured to collect the textual information from an online community 101 and the profile information 104b of the community's users. The crawling module 105 may provide the aggregated information to a Social Inference Module 110.

The Social Inference Module 110 may be configured to detect and classify the social roles of users from the topics of conversation of the community. The Social Inference Module gives its classifications and detections to the Social Recommendation Module 130.

The Social Recommendation Module 130 may comprise various subcomponents or modules for making suggestions or recommendations to users, such as profile augmentation recommendations 131, on-line conversation recommendations 133, and social goal alerts 135. The social recommendation module may be configured to suggest to users, based on the data inferred from the Social Inference Module 110, (i) information about themselves that may be added to user profiles 141; (ii) conversations users might join based on their assumed social roles and/or current social roles needed 134, at module 143; (iii) conversations where users might fulfill some of their desired social goals 136, at module 143; and (iv) alerts when user behavior is affecting/helping the user to achieve one of or more social goals 135, at module 145.

The Social Persona Visualization Module 150 may be configured to provide users with an interactive visualization and interface 151 that lets users introspect on the different online social personas their data has created. The interface 151 may also let users analyze different aspects of their data, such as overall social personas created and how specific data snippets contribute to a particular social persona. The interface may also let users delete and update their data, and view how this changes their online image (social personas made in the community.) This module may also provide users with an interactive interface 151 through which users may teach the system how certain data (posts or comments) can be linked to certain online social personas in the online communities in which the user participates.

Figure 2:
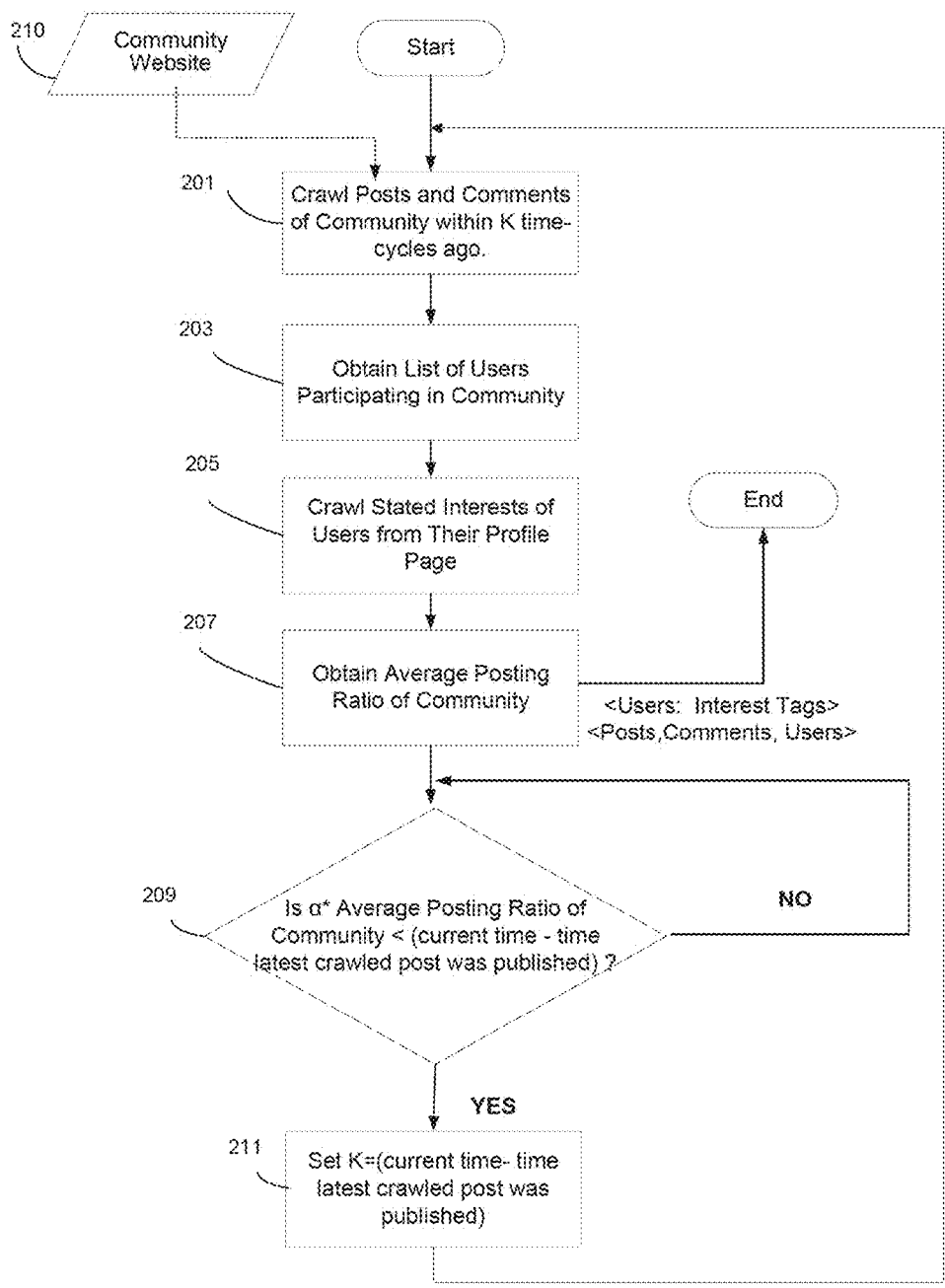
FIG. 2 is a flow diagram illustrating an example crawling module method, according to an embodiment.

In the following description additional details are discussed about each module:

Crawling Module: The crawling module 105 module collects (crawls 107) the K latest conversations (posts and comments) of an online community, along with the profile page of users participating in the discussion. This module 105 calculates the average posting rate of the community and collects data periodically every τ*average_posting_rate_community. The posting rate is calculated as the time difference from when one post is created to the other. The crawling module 105 may also crawl and collect data on conversations, posts and communities that are specifically identified in the tags of users 109. FIG. 2 illustrates an example method for crawling, according to an embodiment.

In an example method for crawling, information from a community website 210 is used. The crawling module may be configured to crawl through K months of posts and comments for the community 210, in block 201. The crawling module obtains a list of participating users, in block 203. The crawling module obtains stated interests of the users of the community from their respective profiles, in block 205. The module obtains the average posting ratio for the community, in block 207. A determination of whether α*Average Posting Ratio of Community Time Passed, is made in decision block 209. If so, then in block 211, the system sets K equal to the amount of time that has passed between now and the time the last post was crawled; crawling for K time cycles continues at block 201. If the time has not passed, as determined in block 209, then the system waits for more time to pass before crawling and collecting more data from the community.

For purposes of this example, the average posting ratio represents how much time typically passes before someone posts something new in the community, a is a design parameter that when used in combination with the average posting ratio can help the designer select how long the system should wait to crawl again data from the community.

Social Inference Module: The social inference module 110 is comprised of two parts: Social Role Inference block 111 (aka social conversation block) and Social Identity Inference Block 113 (aka stated identity inference block).

The Social Role Inference Block 111 may be configured to discover the social roles found in the discussion via topic modeling techniques and sentiment analysis. A module or subcomponent 112 is configured to detect user's preferred topics of conversation. A module or subcomponent 114 is configured to detect users' roles, e.g., topical Mavens, Newbies, Moderators, Trolls, etc. A subcomponent or module 116 is configured to identify social roles that are missing from conversations.

The Social Identity Inference Block 113 may be configured to detect topical Mavens, Newbies and interests of users, based at least on the user's stated interests, for use by a profile augmentation recommendation module, discussed more fully below. The social roles are now related also to topics. A user may be a Troll for political topics, but act as a Moderator in topics that have to do with other topics, for instance, related to parenting or computers. This block focuses more on the user's topical goals, whereas block 114 focuses on the conversations, to identify general missing roles.

Figure 3A:
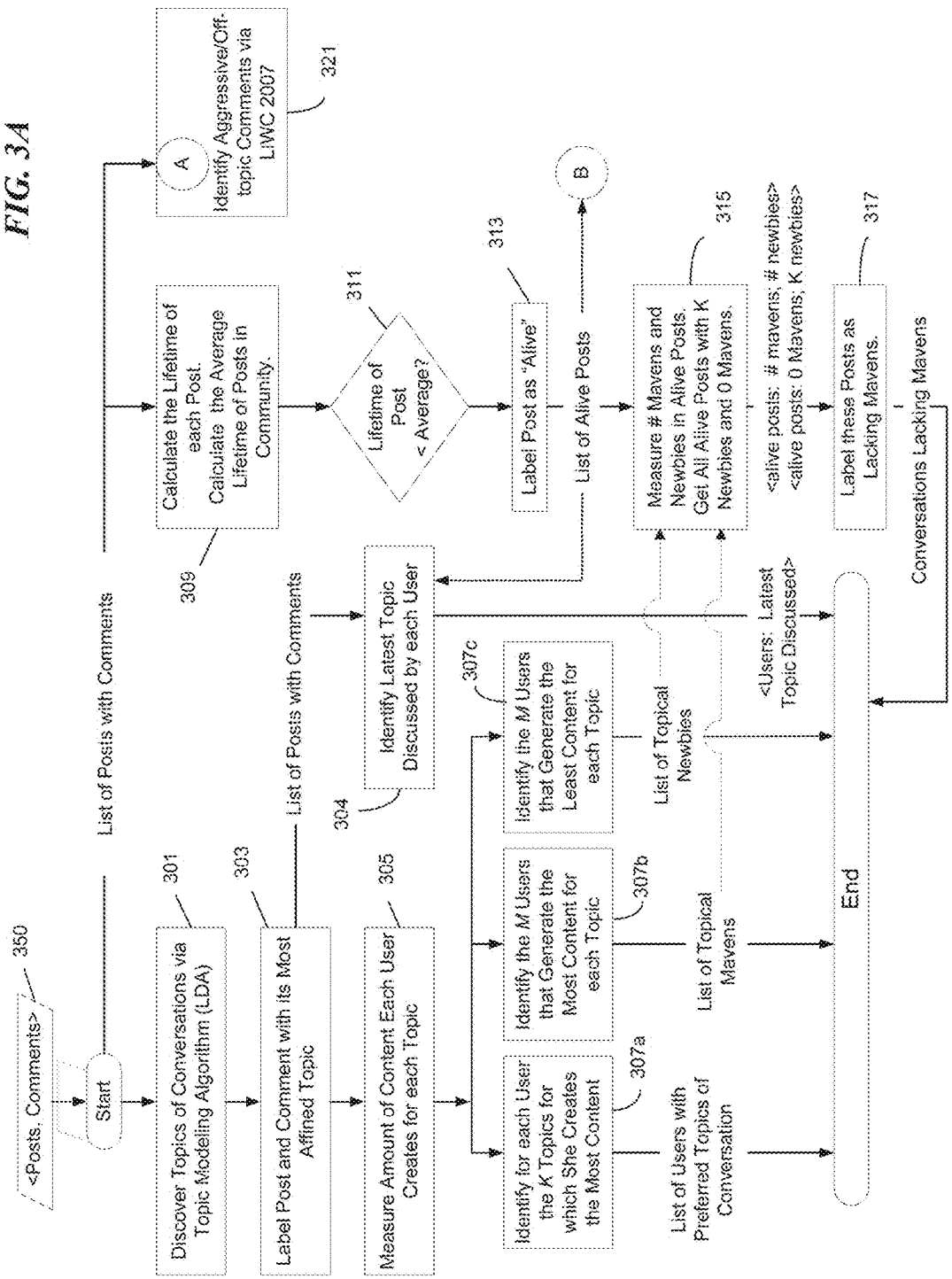
FIGS. 3A-B are a flow diagram illustrating an example social role inference module method, according to an embodiment.
Figure 3B:
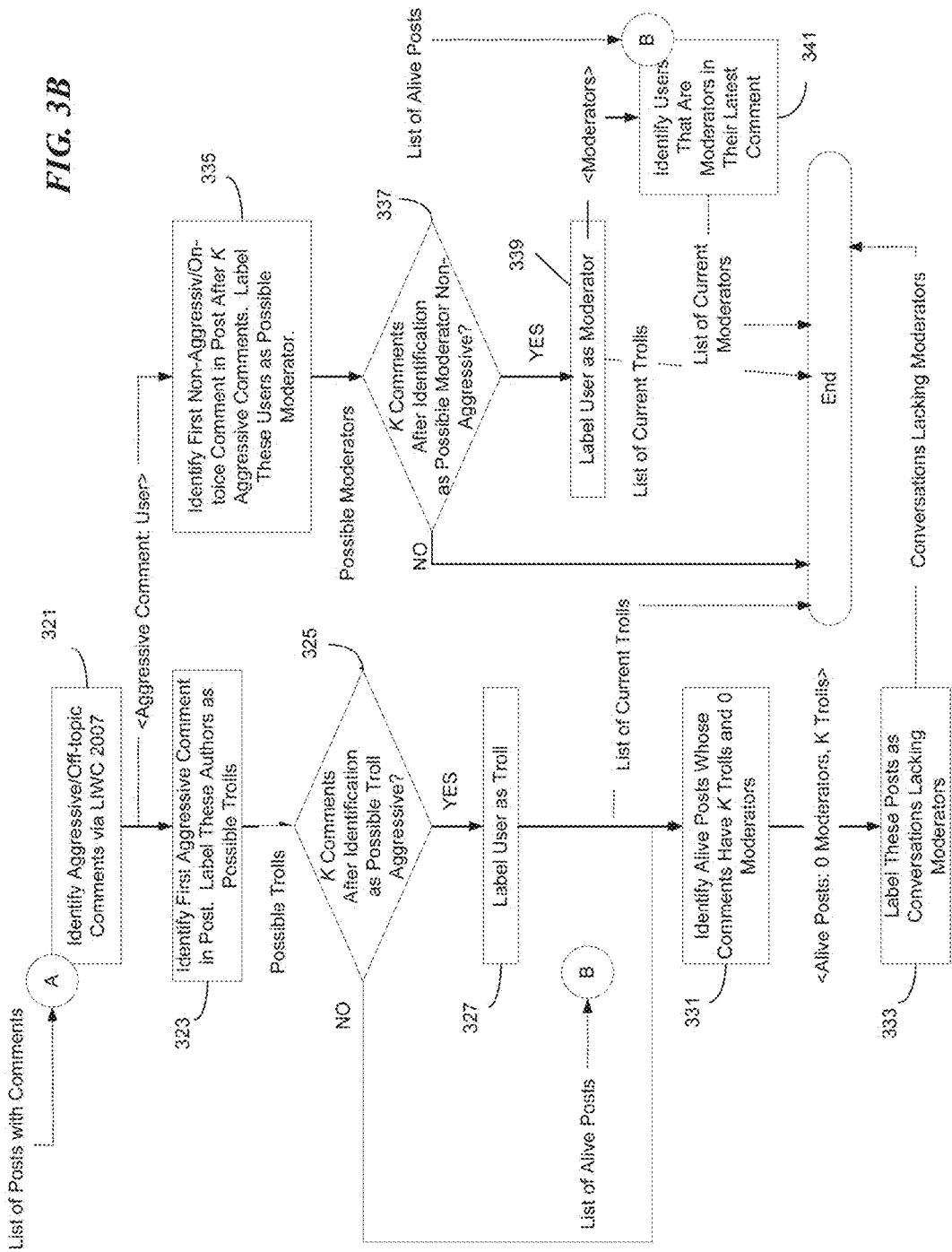

Referring now to FIGS. 3A-B, there is shown a flow diagram illustrating an example method for performing social role inference 111. Latent Dirichlet Allocation (LDA), a topic modeling algorithm, may be utilized to obtain an estimation of the topics involved in the discussion in block 301. LDA is fed a series of documents 350, and from these documents discovers the "topics" that occur in the collection of documents. A "topic" is a collection of words that occur frequently together. In this case, each document that is fed to LDA corresponds to a post from the community. After LDA discovers the overall topics of the discussions in the community, the affinity of each post and comment is obtained to each discovered topic. Each post and comment is labeled with its most affined topic, in block 303. Latest topics discussed by each user may then be identified in block 304. The amount of posts and comments each user generates towards each specific topic is measured, in block 305. For each topic, the K users that generate the most (and least) content for a topic are identified, in blocks 307a-c. Users creating the most content for a topic, for instance, are labeled as "Experts" of that topic. Users creating the least content on a topic, or asking the most questions on a topic, for instance, may be labeled as "Newbies" of a topic, especially when the question has been explored in detail by the community previously. Repeated questions may be identified by WordNet® application to measure the similarity between a new question posed to the community and questions previously asked in the community. WordNet® is a large lexical database of English. Nouns, verbs, adjectives and adverbs are grouped into sets of cognitive synonyms (synsets), each expressing a distinct concept. See. Miller, G., *A. WordNet®: a lexical database for English, Communications ACM* 38, 11 (November 1995), 39-41.

Other social roles that may be detected with the social role inference module 111 are "Trolls" and "Moderators." Trolls are a group of users whose comments may shift the initial topic of conversation to another topic, for instance, as identified in block 321, using Linguistic Inquiry and Word Count (LIWC 2007). LIWC is a text analysis software program and calculates the degree to which people use different categories of words across a wide array of texts, including emails, speeches, poems, or transcribed daily speech. More information on LIWC may be found at www*liwc*net, where periods in URLs are replaced with asterisk in this document to avoid inadvertent hyperlinks. The first initial topic of conversation may be identified by using LDA over the text in the original post and calculating its topic vector. Comments generated for the post may be gathered, and then LDA may be used to obtain their own topic vector. A similarity metric, such as L2 norm, may then be used to measure how similar or dissimilar the comments are to the main post. Comments, whose similarity to the main post is below threshold T, are labeled as dissimilar. The M first dissimilar comments may be gathered and their authors labeled as possible Trolls, in block 323. Trolls may also be identified as those users posting aggressive comments. A determination may be made, in block 325, whether there have been K comments made by the user after the identification of the user as a possible Troll, where those comments are aggressive or off-topic. It the user continues to be aggressive or off-topic, the user is labeled as a Troll in bloc, 327.

A Moderators is a user for whom the K comments before their own comment were dissimilar, e.g., were not aligned with the main topic of conversation, but their comment and the K comments after their comment were similar to the main topic of conversation. In other words, Moderators serve to bring a conversation back to the main topic once it has been diverted, as identified in blocks 335, 337, 339. Block 341 helps to identify the current moderators that exist in alive conversations. Modeling current social roles taken is needed for praising or alerting the user when they are derailing or reaching their desired goal; it is also needed for identifying conversations that might need the insertion of certain social roles to reach a balance.

It will be understood that additional roles may be conceived and added to this module based on the community and their online interactions. For example, in certain cultures, there may be an obvious hierarchy of leaders and followers that can be highlighted.

This social role inference module 111 may also identify the likelihood of a conversation still being discussed by the community, the conversation to be labeled as alive. The average lifetime of the conversations of the community is calculated in block 309. The current lifetime of a particular conversation is then identified as being either below or above the average. If the average is equal to or below the average lifetime, as determined in block 311, then the conversation is labeled as alive, in block 313. The lifetime of a conversation, may be calculated as the time that passes from when the conversation was first started in the community, and the time it received its last comment.

From the list of conversations that are alive, the system then identifies a list of current Trolls, Moderators, Mavens, list of latest topic discussed by each user, list of the social roles present in each of these conversations, as well as a list of relevant dead conversations, in block 315. To identify relevant dead conversations, LDA may be used to model each dead and alive conversation as a topic vector. Using a similarity metric, such as L2 norm, the similarity each dead conversation has with each alive conversation is measured. When the similarity between the two is above threshold t, the old conversation is considered relevant to the new conversation. For alive conversations having no Mavens, or knowledgeable, frequent on-topic posters, the conversation may be labeled as lacking a Maven, in block 317.

It will be understood that FIGS. 3A-B are an illustrative flow diagram of an example method. Elements shown may be processed sequentially, concurrently, in parallel, in order, or in an alternate order, etc.

Figure 8:
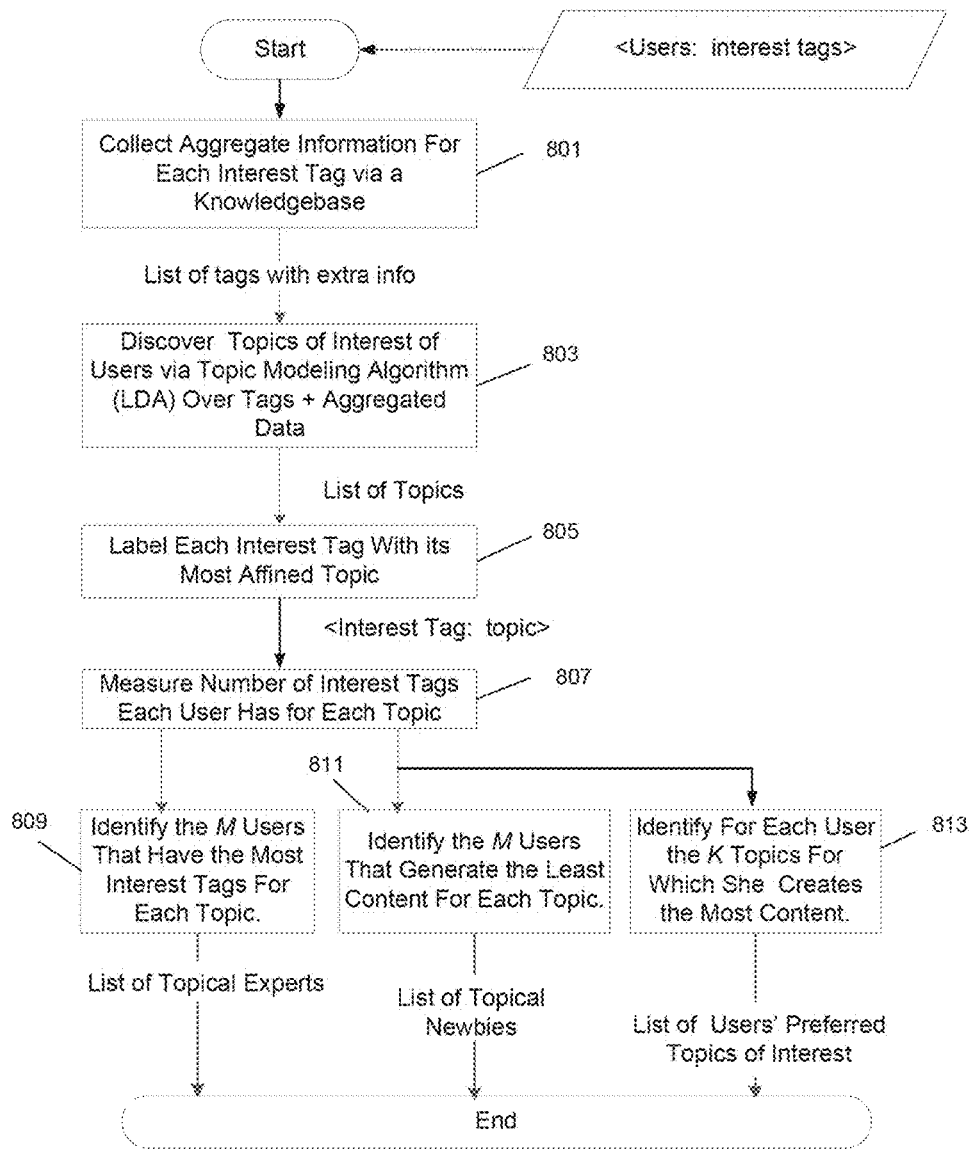
FIG. 8 is a flow diagram for an example method for a stated identity inference, according to an embodiment.

FIG. 8 is a flow diagram illustrating an example method for the Stated Identity Inference Block 113. This block, or module, discovers the stated topics of interest of users, and level of expertise in these topics via topic modeling techniques (LDA) applied to the tag users used to state their interests in their personal profile page. Tags in social media may be very sparse and hard for a machine to interpret, especially since tags might just be names from pop culture, such as e.g., "Lady Gaga." A crowd-sourced knowledge base may be used to obtain a small description about the tag and aggregate this information for better machine interpretation, in block 801. These documents (tags+ aggregate data) are fed to LDA and used to discover the topics that define the users' interests, in block 803. After the topics are discovered, each tag interest of each user is labeled with its most affined topic in block 805. The number of interest tags each user has for each topic is measured in block 807. For each user, the K topics most related to the user's interest tags are identified, and then labeled as topics of interest for the user.

The level of expertise for a particular topic is obtained by leveraging how related the interest tags of a user are to a specific topic of interest and the amount of other users that share those same interest tags. For example, for the topic of "Pop Music," two users may have the following relevant interest tags: User A along with 10,000 other users used interest tag of "Lady Gaga," and user B, along with 1,000 other users used the interest tag of "Born this way." For this example, the module labels User B as a greater expert than User A for the topic of "Pop music."

The notion of this idea, is that experts have tags that are very specialized. Thus, fewer non-expert users have stated an interest for the tags that the experts have as interests in their profile. For example, the tag of "Lady Gaga" might have 1000 users interested, whereas the tag of "Bad Romance" has 500 users interested. The users that have an interest for "Bad Romance" are more likely to be greater experts in Lady Gaga's music than the users that merely used the tag of "Lady Gaga," because the tag of "Lady Gaga" is more generic than the more specialized tag of "Bad Romance." More specialized tags denote a greater expertise. Users are then ordered based on their level of expertise for a particular topic. In block 809 per topic, the K users with the highest level of expertise are taken and labeled as experts in the topic. In block 811 per topic, the K users with the least level of expertise (but greater with a level greater than zero) are labeled as topical newbies. In block 813 per user it is identified the K topics he or she has generated the most data for, and these topics are labeled as the user's preferred topics of interest.

Figure 4:
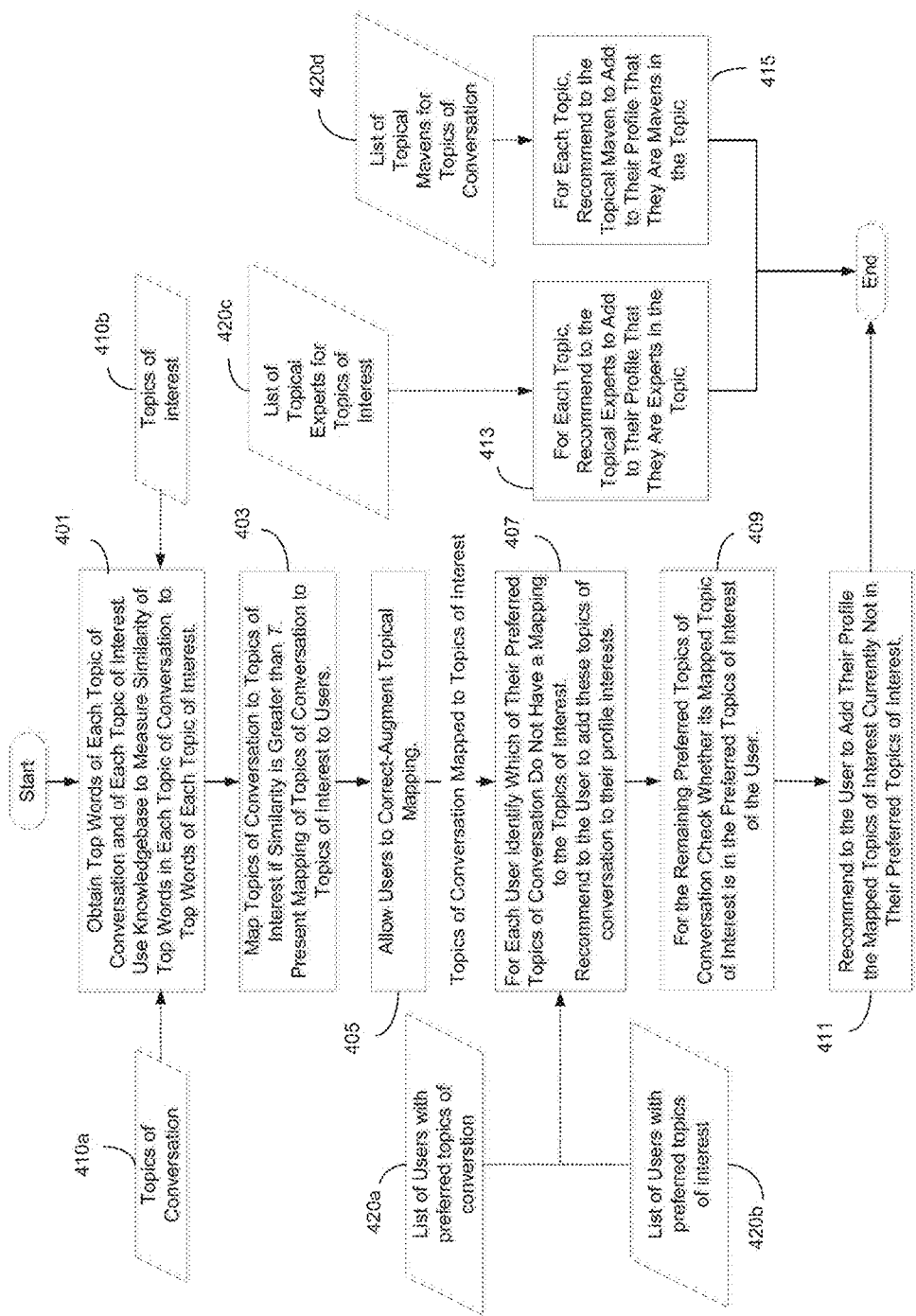
FIG. 4 is a flow diagram illustrating an example method for profile augmentation recommendation, according to an embodiment.
Figure 5:
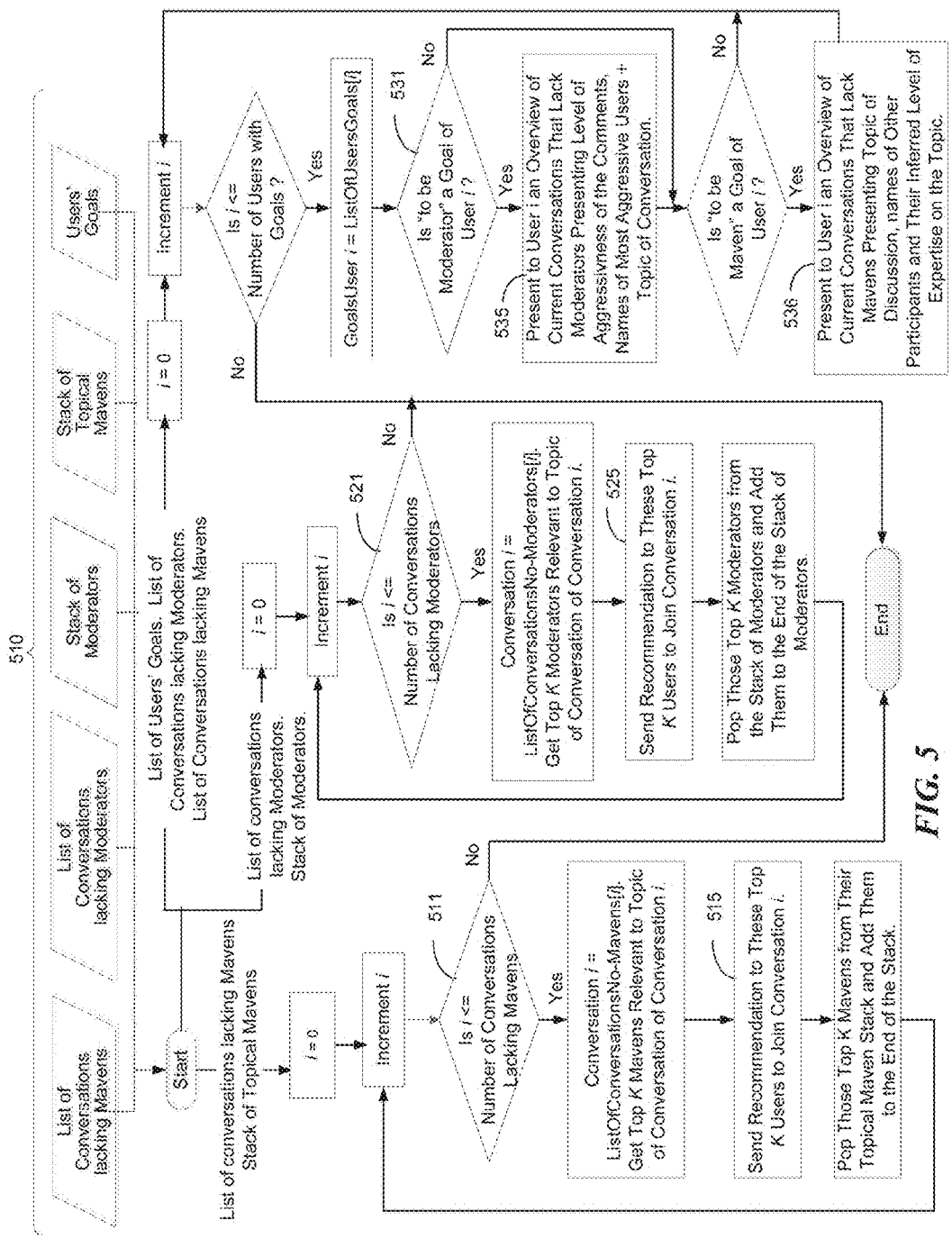
FIG. 5 is a flow diagram illustrating an example online conversations recommendation module method, according to an embodiment.
Figure 6:
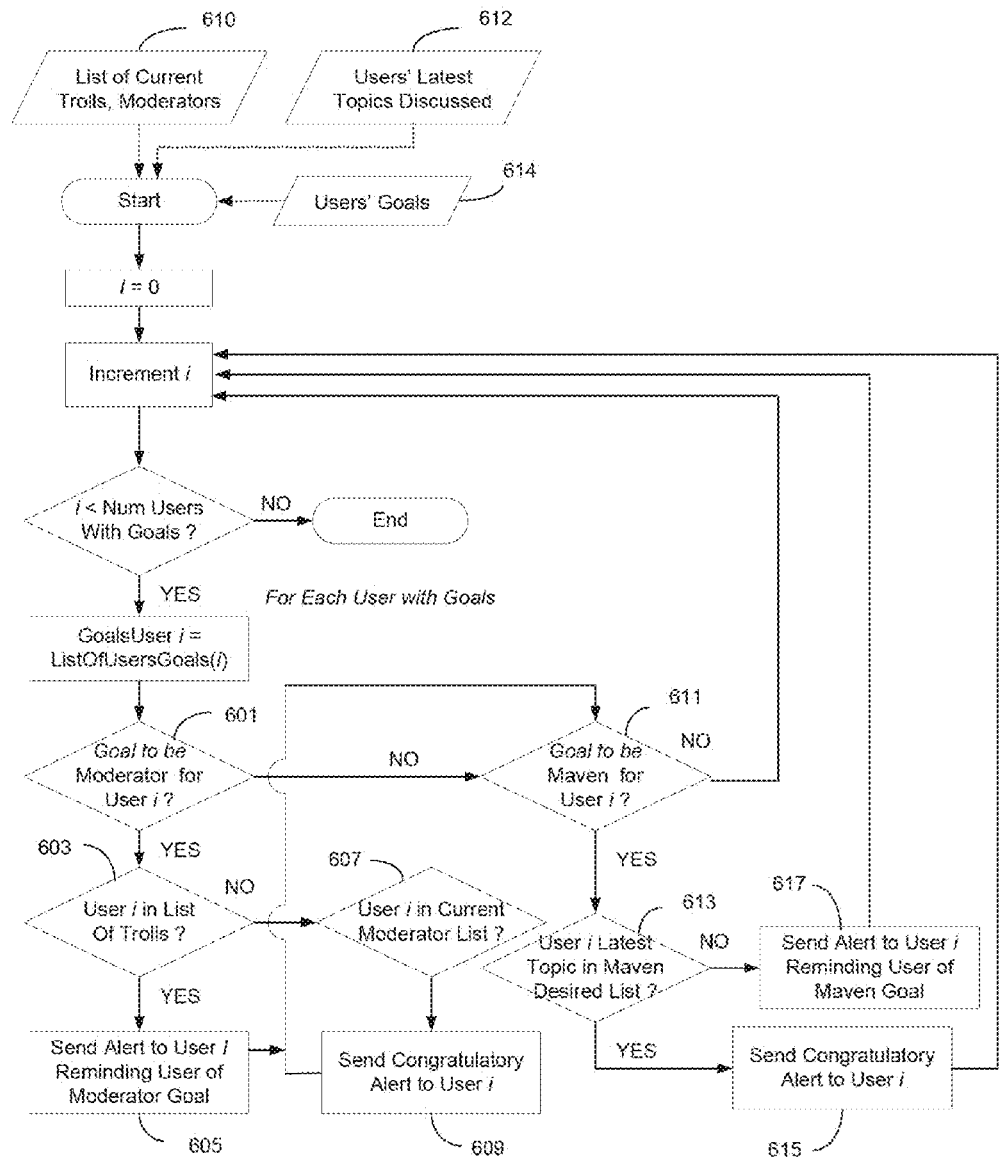
FIG. 6 is a flow diagram illustrating a social goal alerts method, according to an embodiment.

Referring now to FIGS. 4-6, there is illustrated a flow diagram for an example Social Recommendation Module 130 (FIG. 1B). This module 130 receives the classifications and inferences from the Social Inference Module 110, such as list of Mavens. Newbies on X topic, list of Moderators, Trolls, topics of interests and preferred topics of conversation of each user, and social roles present in each discussion 510. The Social Recommendation Module 130 may then use this data to provide different types of social recommendations. An embodiment may utilize three different working blocks to achieve this result: Profile Augmentation Suggestion Block 131, Online Conversation Recommendation Block 133 and Social Goal Alert block 135.

An example module for Profile Augmentation Suggestion Block 131 is illustrated as a flow diagram in FIG. 4: This block maps topics of interest of users to topics of conversation of the community, via WordNet®, or other similar ontologies, which can measure the similarity between different groups of words. This process identifies when the stated interests of a user differ from the user's preferred topics of conversation. This information is then used to make suggestions or augment automatically the online profile of the user, e.g., add topic X, which they discuss continuously in the community. For users that were inferred to be experts or Mavens in X topic, this block may also recommend that the user add this information to their profile.

In an example method for how stated interests are mapped to topics of conversation, the module obtains top words of each topic of conversation and of each topic of interest, in block 401. Topics of conversation 410a and topics of interest 410b may be retrieved from one or more knowledgebases, or data storage location. The knowledgebase is used to measure similarity of top words in each topic of conversation to top words of each topic of interest.

In block 403, topics of conversation are mapped to topics of interest if similarity is greater than threshold T. Mapping of topics of conversation to topics of interest may be presented to users. Users may be allowed to correct or augment topical mapping in block 405.

The module may also be configured to make recommendations to users to add topics of interest, as shown by the user's activity. In block 407, for each user, the module may identify which of their preferred topics of conversation do not have a mopping to the topic of interest. Lists of users with preferred topics of conversation or interest 420a-b may be retrieved from data storage, as identified in the social role inference module 110. This process checks if the topic of conversation has a mapping to the interests in users' profiles, but it checks with respect to all users. When a mapping exists, it is because one or more users had tags about the topic in their profile. If the topic of conversation does not have a mapping to the topics in the profile, it is clear that no user has added such interest to their profile. The first type of recommendations made, are for suggesting to the user to augment their profile with such topics that had no mapping but where present in the user's posts and/or comments; the user is also informed that no one else has added such information to their profile, thus providing social awareness. The user may augment their profile based on the recommendations and contextual information.

For remaining preferred topics of conversation the module may check whether its mapped topic of interest is in the preferred topics of interest of the user, in block 409. In block 411, the module may recommend to the user to add their profile the mapped topics of interest currently not in their preferred topics of interest. In this case, the recommended topics did have a mapping but the user in particular had not added the topic to her profile.

It will be understood that this module may be executed on a community or conversation Server at a specific periodicity to pro-actively send users recommendation regarding their profiles, or may be launched or commenced by an administrator or Moderator for the community. In another embodiment, a user may launch a local version of this module, or request the community server to provide profile augmentation recommendations, on an ad hoc basis. It will be understood that various modules, as described herein, may be run as local versions, or run from a community server. For instance, a user may prefer to run a local copy of persona visualization to assess the user's outward facing social persona. The user may also prefer to launch a variation of the social role inference module to provide personal feedback on the user's social roles and whether they are consistent with the user's goals.

Lists of topical experts for topics of interest 420c may be used in block 413, where for each topic, the module may recommend to the topical experts to add to their profile that they are experts in the topic. Lists of topical Mavens for topics of conversation 420d may be used in block 415, where for each topic, the module may recommend to the topical Mavens to add to their profile that they are Mavens in the topic.

FIG. 5 illustrates a flow diagram for an example method for the Online Conversation Recommendation Block 133: This block identifies social roles that are lacking in discussions that are alive (meaning being contributed to and discussed) 511 (lacking Mavens), 521 (lacking Moderators) and finds users that could fulfill those needed social roles. Data 510 may be retrieved as identified in the Social Role Inference module. This block may also resurface K old conversations that are relevant and could be of interest to users participating in the discussion.

To identify when a conversation is lacking certain social roles, the block analyzes whether there are greater than K Trolls or K Newbies in the discussion and no Moderator or Maven is participating in the discussion. Depending on the case, the system may then search the list of Moderators or the list of Mavens, and send alerts 515, 525 to the top K users of these lists. If after a period of time these K users do not respond, the system may alert the next top K users. It will be understood that this module may be executed on a community or conversation server at a specific periodicity to check for missing roles in conversations, or may be launched or commenced by an administrator or Moderator for the community.

This block may also analyze whether a social role that is lacking in a conversation, matches the roles users had as targets in their social goals 531. In such cases the system may send alerts to these users to notify them of the opening 535 (Moderator alert) and 536 (Maven alert). This block may also present to users a visualization of the recommended conversations, providing an overview of the topic of discussion, level of aggressiveness, names of participants with their level of expertise on the topic, such visualization is provided because certain users might feel intimated to participate in a discussion, when certain type of users are present, or the discussion involves a certain level of aggressiveness.

Additionally this block identifies the K most relevant old conversations, and may display them to the side of the original discussion.

FIG. 6 is a flow diagram illustrating an example method for the Social Goal Alert Block 135. This block receives the latest topic of discussion of users 612, and their latest social role taken 610. The block then analyzes whether the social role taken by the user antagonizes with his/her social goal 614, in which case the system alerts the user of the potential danger. For each user with a stated goal, an example method first determines whether a goal is to be a Moderator, in block 601. If so, then it is determined whether the user is in the list of Trolls for the conversation, in block 603. If so, then a warning message/alert may be sent to the user as a reminder that the goal is to be a Moderator, in block 605.

If the user is not listed as a Troll, then it is determined whether the user is in the current list of Moderators for the conversation, in block 607. If so, then a congratulatory message/alert may be sent to the user, in block 609. A determination is made as to whether the user has a goal to be a Maven, in block 611. If not, the process continues for the next user. It will be understood that if other goals have been defined for a community or conversation, then additional checks will be made for the additional roles [not shown]. If the user goal is to be a Maven, as determined in block 611, then it is determined whether the user is on the current list of Mavens for the conversation, in block 613. If so, then a congratulatory message/alert may be sent to the user, in block 615. If the user is not on the current Maven list, then a warning message/alert may be sent to the user as a reminder that the goal is to be a Maven, in block 617.

In an embodiment, the user's goal might be to be more like a specific other user, or unlike a specific other user. In this case, once the user selects a user to be like or unlike, an analysis of that user's profile, if available, and behavior may be performed to identify social roles within conversations and communities. The user may then be alerted when behavior indicates similarities or dissimilarities to the identified user's behaviors. In existing communities, it may be easier to model one's goals after a user with whom one has a direct connection. Future systems may make profiles and behavior available even when there is no direct connection between users. Further, users may have multiple on-line personas and/or profiles to characterize different aspects of the users life (professional, personal, religious, family, etc.). In embodiment, a user may specify a different sets of goals for each persona. In an embodiment, a user may select a single set of goals for multiple personas, but must define a user ID, for instance, for each one to link them as related. In existing systems, it may be difficult to link online personas of other users, but future systems are expected to be better at correlating different personas of the same user. In systems where this correlation is possible, modeling oneself after another user with multiple personas may be possible. In an embodiment implemented with existing online communities, a single persona will typically be used.

Figure 7:
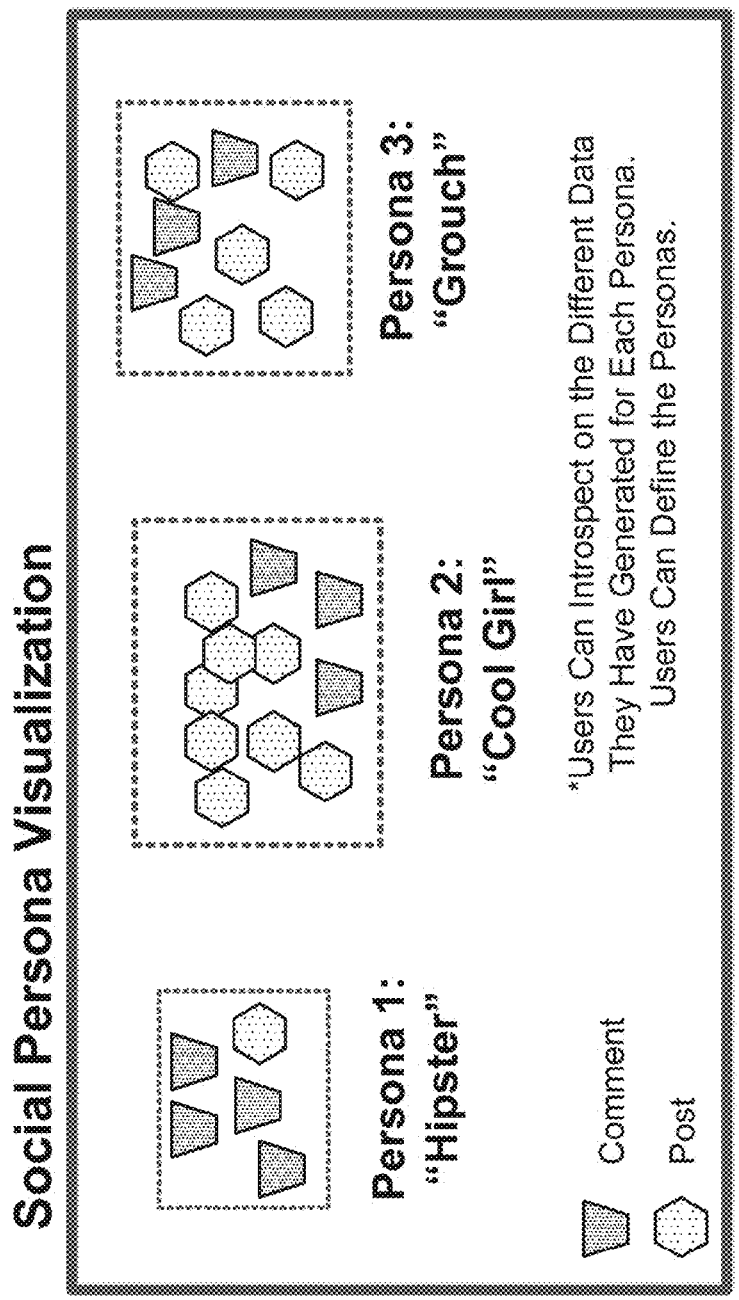
FIG. 7 is a block diagram illustrating a social persona visualization graphic, according to an embodiment.

Social Persona Visualization Module 150: FIG. 7 illustrates an example visualization for online personas. This module receives the classifications and inferences from the Social Inference Module 110, such as list of Mavens, Newbies on X topic, list of Moderators, Trolls, topics of interests and preferred topics of conversation of each user. The module uses these initial classifications to present to users a visualization of the social personas the systems considers they have created in the online community. The initial social personas considered are that a user is a: Maven, Moderator, Troll, or Newbie. The interface may present users how much of a Maven. Moderator, Troll, Newbie they are with respect to the rest of the community members. Each social persona is presented with the set of posts and comments that contributed to the formation of such social persona in the community. The social persona may include a characterization (role) with respect to a community or conversation, e.g., "hipster," "cool girl," "grouch," etc., and those posts and comments which contribute to this characterization. When possible, a user may be able to select a post or comment associated with a persona and delete it from the conversation or community. If it is not possible to delete or edit a post, the user may be able to mitigate the deleterious effects of a post associated with an undesirable persona by creating more posts similar to those found associated with the desirable personas.

This module allows user analyze how different data snippets (posts or comments) contribute to a particular social persona. Users may delete/edit the data snippets and analyze how the data affects their overall ranking for a particular social persona. Users may also sort their posts and comments with respect to time and analyze the role each data snippet has played in their current portrayed social persona.

Additionally, this module allows users interact with the data, and teach the system through examples how different social roles and particular content can be linked to certain social personas. The user may state with the interface that being a Troll in "X" topic, and stating to have an interest in topic "Y" is related to the social persona of being a "Hipster." The system uses these initial seed categorizations to classify the full extent of the user's social data.

The interface provides a new visualization based on the user defined social personas. Users may analyze the system's classification, and introspect on the social personas they are creating within the community. If necessary, users can again eliminate/edit their data (posts and comments,) and view how it affects the social personas they create in the community. It will be understood that visualization of social personas may be implemented in a variety of ways (e.g., histograms, graphs, tables, trees, related links, etc.) and that embodiments as described herein are not limited to one form of representation.

EXPERIMENTS AND EXAMPLE EMBODIMENTS

Introduction

Peter Steiner once wrote in a cartoon caption. "on the Internet, nobody knows you're a dog." That phrase soon went viral. Since then, users have experimented with many forms of self-expression ranging from simple user name choices to detailed descriptions of their tastes in online dating sites. Sociological theory considers these self-disclosure processes to be an important component of social interactions, as people during all social encounters adapt their appearance and manner to control the image others have of them. In both the digital and physical worlds controlling ones' desired image can be difficult as it is affected not only by the statements one makes about oneself, such as stating to be very organized, or stating to be interested in politics, but also by one's behavior, e.g., having a disorganized desk shows one's tendency to be messy or writing articles about politics manifests one's interest for the matter. In the digital world, users have more control over their image mainly because they generally have more time to ponder how they will react to certain events and thus promote their desired image, i.e., how they are perceived by others. However, control in the digital world can also be complicated by the fact that "the Internet never forgets." All content that users create and share with other online users is persistent, searchable and replicable. The long-term persistence of data complicates the creation of one's desired image. For example, the interests a user stated to have in 2006 may no longer match her current interests, yet the data may still be available to see by her acquaintances, including her future employers.

Building on previous research, which considers that people's interests and traits are inferred from their statements and behaviors, the authors built a framework, as described herein, to analyze the dynamics between users' statements in their online profile, and their behaviors within an online community, specifically what they post and comment about.

The term stated interests is introduced to refer to the interests users have defined in their online profile, and the term manifested interest is introduced to refer to the type of content that users post and comment in an online community, e.g., a tag in ones' profile about "Society for the Prevention of Cruelty to Animals" would denote ones stated interest for "Animal Rights," while posting and commenting about "Animal Shelters" would manifest one's interest for the topic.

The authors have centered a study on one of the most active moderated and public LiveJournal™ communities: Ontd (oh no they didn't)_political. Ontd_political lends itself for studying the different relationships that exist between users' stated interests and users' actual online discussions, because the discussions on this community cover a wide spread of topics that can range from controversial parenting approaches, gender and racial inequality issues, to the U.S. elections. The users of this community also state in their profiles a wide spectrum of interests that include Middle Eastern feminism, American cartoon characters and other distinct topics.

In applying the framework to this data, we show that users follow determined patterns when stating and manifesting an interest for a given theme, e.g., there appear to be clear norms on the amount of different tags users use to state an interest for a particular theme. Results suggest that more than half of the postings in Ontd_political are event driven. However, the few users who appear to post about a theme based on a personal interest, engage in periodic posting about the theme.

Related Work

In online communities users express their interests via posting and commenting about certain content. A set of papers has focused on characterizing this content and the social interactions of online communities through an analysis of their digital traces. Earlier work began with studies that discovered the topics discussed by a community. This prior work, nonetheless, did not study the relationships that exist between users and content. The work on content popularity of Yang, et al., in *Patterns of temporal variation in online media, Proceedings of the fourth ACM international conference on Web search and data mining*, WSDM '11, ACM (New York, N.Y., USA, 2011), 177-186, analyzed how the source that generates the content, such as news source or blog, affects the content's popularity (amount of posts and comments created). Their analysis, however, was limited as it did not study how the actual authors of the content influenced the content's popularity. It is unclear whether all content discussed by bloggers becomes equally popular, or whether certain type of bloggers received more attention than others. Was it the bloggers who had stated to be experts in a topic who received the most attention? Was it the bloggers who had actively posted about the topic previously who received more traffic? These questions remain to be studied. Yet for users who want to learn how to become influential bloggers, knowing what to say and what to do can be extremely useful. Yang, et al., also did not study whether the theme of the content had an impact on the content's online popularity.

Recently the work of Guy, et al., in *Mining expertise and interests from social media*, in *Proceedings of the 22nd international conference on World Wide Web*, WWW '13, were able to identify two semantics that relate a user to a topic: interest and expertise, and compared these two semantics across different social media applications. However, their work did not focus on users' different forms of expressing an interest through content, and especially did not compare users' behavior to their profile statements. Rodrigues, et al., in *utrack: track yourself! monitoring information on online social media*, in *Proceedings of the 22nd international conference on World Wide Web companion*, WWW '13, describe a system which allows end-users to track all of their online activities across different social media sites. That system did not, however, allow users to introspect on the differences and similarities between the way they are defining themselves and their actual online behavior. It also did not let users study the different social roles they assumed in a community.

Lately, data modeling has been extended to characterize users based on the type of content they generate. Nonetheless, these studies are limited in that their work did not study the different forms in which users engage with content for stating and manifesting their different interests. The work of Agarwal et al., in *Identifying the influential bloggers in a community, Proceedings of the* 2008 *International Conference on Web Search and Data Mining*, WSDM '08, ACM (New York, N.Y., USA, 2008), 207-218, studied how to detect influential bloggers. Agarwal et al., did not however, explore the different ways in which these bloggers express their online interests. Such study may be insightful for systems that seek to guide the user in how they should present their profile and blog posts to become influential. Other works have found that the events that users decide to discuss with an online community involve a complex dynamic that sits between important personal events and events users believe would be of interest to their online audiences. The present disclosure extends these ideas by analyzing the similarities and differences that exist between the type of things users have stated previously to be interested, and the type of things they post and comment about in the community.

Current Social Recommender Systems have focused more on finding other users to whom a person may be likely to share online content, see e.g., Amershi, S., et al., *ReGroup: Interactive Machine Learning for On Demand Group Creation in Social Networks, Proceedings of the SIGCHI Conference on Human Factors in Computing Systems* (CHI '12), ACM, New York, N.Y., USA, 2012: Bernstein, M., et al., *Enhancing directed content sharing on the web. Proceedings of the SIGCHI Conference on Human Factors in Computing Systems*. ACM, New York, N.Y., USA, 2010; or on identifying online content that may be of interest to the user, see e.g., Google® Alerts. This previous work fails to suggest to users the type of contribution they may make to a community, based on the community's needs or the user's overall goals. Facebook, for example, gives users friend posts to view based on the friendship relationship, but there is no recommendation on the type of social role the user should assume in the conversation, or the type of contribution the user should make, to fulfill a personal goal or to help the community grow and have a healthy balance.

Google® Alerts, Alltop (for top stories), Monitter (real time Twitter monitor), TweetDeck, BackType, PostRank Analytics, for example, monitor millions of blogs, Twitter conversations and news sites, and help users follow conversations of their topic of interest online. However, these existing systems do not analyze a user's individual posts and behavior in order to help them identify opportunities that would highlight their uniqueness through expertise or social roles.

Online discussion boards are very significant and are quite literally where most people go to obtain political information. It is important to know the type of users who are contributing to such sites simply because of the influence they may have in the political process.

The Model

The foregoing discussion may be built on a framework to provide a modeling of users' statements and online behaviors in a form that allows for both entities to be compared and quantified. In an embodiment, the framework is targeted for use in large and active online communities, whose members have a space for stating their personal interests through tags in their profile (interest tags) and a space where through their behavior (posts and comments made) they can manifest their interests.

Figure 11:
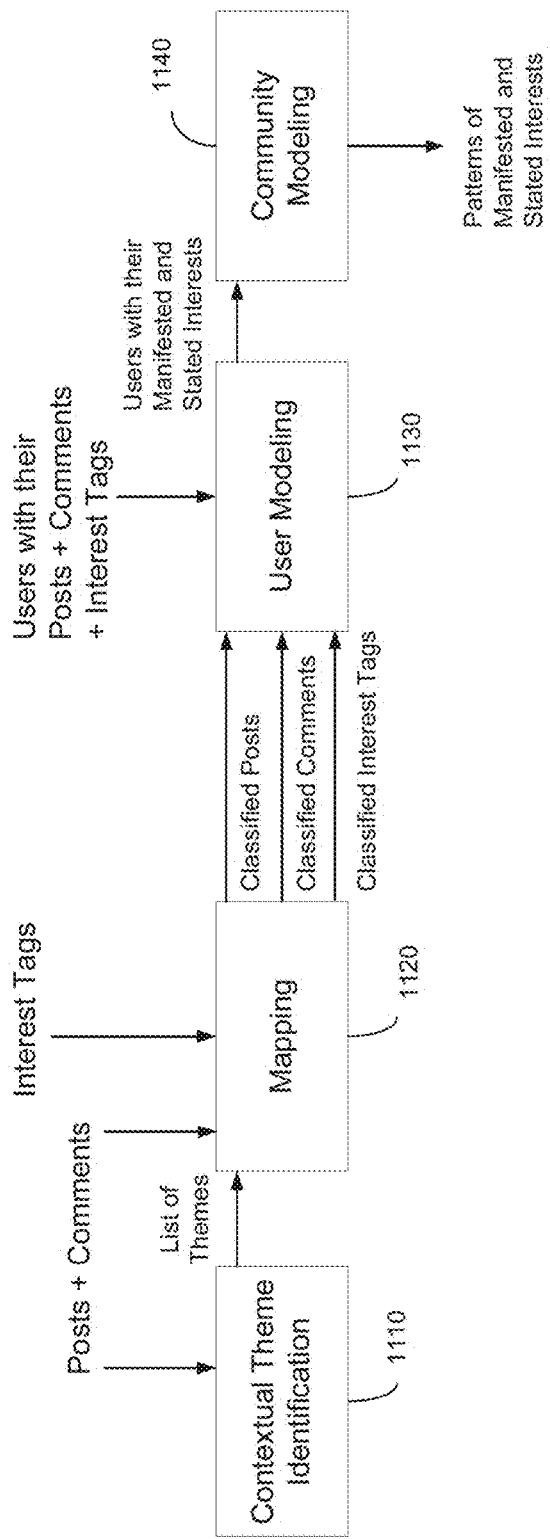
FIG. 11 illustrates a pipeline of how the framework disclosed herein identifies the patterns of stated and manifested interests of the community are modeled given the community's posts, comments and interest tags, according to an experiment of one embodiment.

Given an online community, the goal of the framework is threefold: (1) discover the different theme-based interests present in the community's discussions (posts and comments created); (2) categorize posts, comments, and interest tags into these discovered theme-based interests; and (3) model members' manifested interests and members' stated interests, based on the posts and comments they created around a particular theme, and the thematic interest tags used in their profile. This modeling is then used to compare the stated interests of users to their manifested interests, and identify patterns of interest expression in an online community. FIG. 11 represents a pipeline of an example framework.

Contextual Theme Identification

FIG. 11 illustrates a Pipeline of how a framework identifies the patterns of stated and manifested interests of the community are modeled given the community's posts, comments and interest tags.

First, contextual themes are to be identified within an online community 1110, where the community has expressed an interest via user's posts. For this purpose, a topic modeling algorithm Latent Dirichlet Allocation (LDA) may be used to obtain an initial rough estimation of the topics of interest present in the community's collection of scattered posts. Bayesian Information Criteria may be used to determine the number of desired topics as input to LDA. Each document that is fed to LDA corresponds to a post from the community. Each document holds the title of the post, along with the tags the user added to the post. Note that this topic model is built in context from the community posts. For purposes of this example, it is assumed that users state their interests under a different context than that of the sharing context and hence these may not align directly. There might be, e.g., many interest tags that are completely unrelated to the community's posts, but incorporating them into the topic model might enforce nonexistent relationships. Additionally, modeling the topics of posts together with the stated topics of interest, i.e., modeling all of the information together, can lead to erroneous results, because the posts can overshadow the stated interest, making it difficult to accurately compare stated and manifested interests.

A set of topics or themes covering the interests present in the community's posts are classified, in 1110. A problem that can exist with LDA is that because it decomposes the observed data into latent topics according to a purely data-driven objective function, it is possible to have two different topics covering the exact same concepts but with slightly different wording. To overcome this problem ontologies may be used, specifically WordNet®, a lexical database, to further group similar topics and better categorize the community's interests. A grouping of topics is referred to as a theme.

In an embodiment, for each topic $T_x$, a bag of words $X_i$ is created, where each word $w_i \in X_i$ is one of the K words with highest probability in $T_x$. For illustrative purposes in the following example, K=10. Given two bags of words X and Y, which belong to the topics $T_x$ and $T_y$, respectively, the similarity weight s(X, Y) is calculated between them, in equation (1) as:

$$s(x, y) = \sum_{i=1}^{|x|} \max_{w_y \in y} Sim(w_x, w_y), \quad (1)$$

where $w_{x_i}$ is the i-th word $\in X$, and $w_y$ is the word $\in Y$ most similar to $w_{x_i}$. Sim(.,.) corresponds to WordNet®'s similarity weight for those two words. The similarity weight identifies the optimal word similarities between two topics. This similarity weight s(X, Y) is used to merge topics that are discussing similar matters, but with slightly different wording. This analysis results in a set of themes covering the interests present in the community's postings. Note that a similar procedure may be performed to model the themes present in the community's interest tags, but in this case the documents given to LDA would correspond to the interest tags instead of the community's posts.

Mapping Content to Contextual Themes

In block 1120, stated interest tags, posts, and comments are mapped into the themes of interest discovered previously. For this purpose, each interest tag is taken and augmented with its available definition, for instance, obtained from Freebase ontology. Freebase is a large collaborative knowledge base consisting of metadata composed mainly by its community members. It is an online collection of structured data harvested from many sources, including individual 'wiki' contributions. So, basically the definition obtained is a definition the crowd has given to a tag. For more information, see Bollacker, K., et al., *J. Freebase: a collaboratively created graph database for structuring human knowledge, Proceedings of the* 2008 *ACM SIGMOD international conference on Management of data*, SIGMOD '08, ACM (New York, N.Y., USA, 2008), 1247-1250.

This augmentation step may be used to map proper nouns being used as interest tags, for instance, "Lady Gaga," to themes such as "Pop music." Incorporating ontological knowledge from a reliable source (e.g., Freebase) allows the machine to better interpret and categorize the tags. Given an interest tag with its augmented definition, it may then be used as document input to LDA and to model the document as a topic vector representing the interest tag's relevancy to the topics discovered previously. The topic most relevant to each interest tag, based on the probability the interest tag has of belonging to that topic, is identified and when its relevance value (probability) is above a threshold t, the interest tag is labeled as being relevant to the main theme under which the topic is grouped. For this example, t=0.8. After this step, each theme has a set of relevant interest tags associated.

Following a similar procedure, posts may be modeled as topic vectors and their most relevant themes identified. In an example, the text of the post for the classification is not enhanced, but only their title and tags are used. In the example, it is assumed that the comments of a post follow the same theme as that of their parent post, therefore each comment is classified with the same main theme that was assigned to their parent post. After this step, each theme has a set of relevant interest tags, posts and comments associated.

User Modeling

Once the posts, comments and interest tags categorized into themes are identified, the categorization may be used to study the different dynamics among users for stating and manifesting particular thematic interests, in block 1130. For this purpose, users are modeled in terms of their degree of stated and manifested interest for a particular theme. Specifically, a user's degree of stated interest for a given theme may be calculated as follows, in equation (2):

$$P(u, T) = \sum_{i \in I} P(u)P(i|u)P(T|i), \quad (2)$$

where P(u, T) is the probability of a user u being interested in a theme T given her profile interest tags, $P(u)=n^{-1}$, is the probability of selecting the j-th user u; n is the total number of users; $P(i|u)=m^{-1}$ is the probability of a particular interest tag i appearing in the stated interests of a user u; in is the total number of interest tags the user has in her profile; P (T|i)=1, when the interest tag i is relevant to the theme T, and zero otherwise. We consider that the probability P(u, T) denotes the user's degree of stated interest to the theme T. A similar approach may be used to calculate a user's degree of manifested interest for a theme, but instead of calculating such interest over a user's stated interest tags, the user's posts and comments are used for the quantification.

Online Community Modeling

The purpose of this module, in block 1140, is to cluster users based on how they have presented their online interests. From these groups, general traits and characteristics of its members may be extracted. Each user with two vectors representing their stated and manifested interests may be modeled. The elements of each stated interest vector denote the discovered themes, and each vector entry represent the amount of interest tags the user used to state an interest for that theme. The entries for the manifested interest vector represent the amount of posts the user created for each theme. It is to be considered, that the two vectors represent the user's feature vector. Users are then grouped based on their feature vector, according to a clustering algorithm, (i.e., users that discussed similar themes and had similar stated interests are grouped together). This results in a series of clusters of users. The characteristics of these users' stated and manifested interests may be analyzed, such as the number of different themes they discussed, alignment among their stated and manifested interests, among other traits.

Perceived Human Judgment of the Framework

Figure 12:
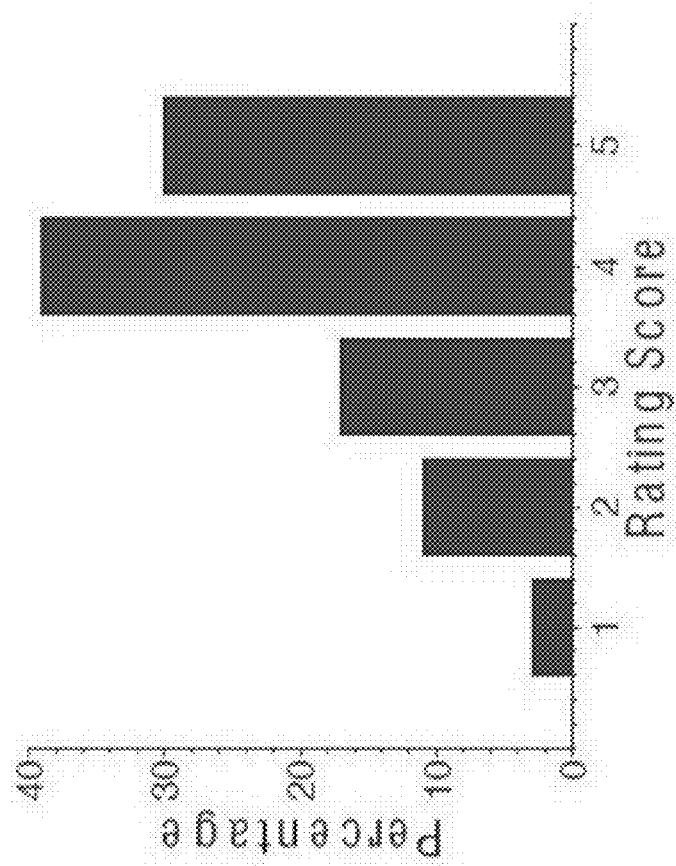
FIG. 12 illustrates a histogram of ratings provided by AMT users, according to an example embodiment.

In an example, Amazon Mechanical Turk (AMT), available from Amazon.com, was used to recruit human raters. AMT is a system to recruit workers to do small tasks for small payments. FIG. 12 illustrates a histogram of ratings provided by AMT users. The rate scale indicates how relevant the result of the disclosed framework was. Notice the right skew of the histogram, which shows that the framework brings relevant data to users.

To understand how the disclosed modeling approach reflects with human judgment, the authors conducted a short study and asked evaluators to rate the relevancy a set of posts and interest tags had to the themes of interest of an online community. In particular, the example framework was run over the content generated by a particular Facebook group (an activist group that organizes social initiatives around the world and covers a wide range of discussions and events), where the stated interest tags corresponded to the Facebook Likes of group members and the posts to the tags of photos posted in the group.

33 participants were recruited using AMT, and each participant was presented with a short survey, containing 5-point Likert scales (1=strongly unrelated, 5=strongly related) about how related a theme was to a list of posts and interest tags. Each participant was given 6 different themes. Each theme was presented with its representative bags of words, and below it a list of 2 posts and 3 interest tags were shown. These posts and interest tags were randomly selected from the set of posts and interest tags our framework found relevant to the theme; each interest tag was presented with its definition from Freebase and each post with its tags.

Participants were paid $0.55 to complete the survey. Statistics from the study are shown in FIG. 12. The size of the bar denotes the percentage of times a certain rating was selected. The right skewed nature of the graph shows that most participants considered that the posts and interest tags were relevant to the discovered themes. It was observed that one of themes received worse rating than the other 5. This result is attuned with the findings of other studies that found that the tags users generate for different thematic content varies in quality, and therefore information retrieval tasks can be affected.

Data

Community Data

Data from a large LiveJournal community was used (see www*livejournal*com): Ontd_political (see Ontd-political*livejournal*com), where periods in URLs are replaced with asterisk to avoid inadvertent hyperlinks, in this document. LiveJournal (LJ) is an online blogging and social network, that started in 1999 and accounts for 8.7 million active users. Each LJ user picks a username, fills a profile page, and authors a journal (blog). Users provide a list of interests on their profile page, location and connect to other users as friends. Interests are stated in LiveJournal as a series of tags. A user can have in her interests, tags such as "Lady Gaga," "Computer science." "Volleyball," among others. Besides personal journals, users have the opportunity to create and contribute to community journals. Community journals let anyone who is a member of that community create and post a new entry. In this example, focus was on one of LJ's most popular community journals: Ontd_political, which continues to rank in the 10 most popular LJ communities (number 7 by page views, and number 4 by visitors, as of September 2012).

Each post in Ontd_political includes the user name of the author, date and time of posting, a title, the text, a set of tags chosen by the author to describe the post, and comments that have been posted in reply to the post. Within Ontd_political's culture it is common practice to copy articles provided by external news sources, as long as the content is relevant and interesting for the community. News sources range from the very popular such as CNN to more obscure ones, however, users often credit the original source by providing a link. Therefore, when a user posts something on Ontd_political, typically the only content the user has actually created are the tags associated with the post. The tags are free text and can include anything that the user wishes to add, but often are meaningful keywords that are representative of the post. This example was primarily focused on studying the content users generated themselves. Online content for Ontd_political's posts (tags, user name, date and time) and comments (text, user name, date and time) were "crawled" between Mar. 30 2012 and Jul. 11 2012 (almost 4 months of data). In addition, each community member's stated interests from their profile page was collected. Statistics of the dataset are shown in Table in FIG. 9.

From the statistics in Table 1 it is observed that 17% of all Ontd_political members had no interest tags in their profile, while 82% of all members had at least one interest tag in their profile. On average, each user had a total of 50 interest tags in their profile. A total of 39,241 unique interest tags were used by community members. This analysis sheds light that the vast majority of Ontd_political community members have invested time in stating their interests.

In this study, only 15% of all community members participate in the generation of posts. This result is in accordance with research studies that have found that post participation in online communities follows a long tail distribution, where only a tiny, active minority produces the majority of the content. A total of 1,972 users created at least one comment in the Ontd_political posts, i.e., all users that posted content, also commented on content posted in Ontd_political.

Table 2 in FIG. 10 shows a sample of stated interests and posts relevant to a topic of conversation. This table provides a qualitative outlook on the type of thematic posts and interest tags present in the Ontd_political community.

Contextual Theme Identification in Ontd_Political

An example framework was used to identify and characterize the themes of interest present in Ontd_political's posts and the themes of interest covered in the community members' interest tags. The framework identified 23 topics for modeling the posts and 11 topics for modeling the interest tags. After grouping topics, the framework identified nine main themes covering the community's posts and 10 main themes covering the community's stated interest tags. Adequately labeling collections of topics is still an open research problem and is not the focus of this disclosure. But, for the purpose of referring to the discovered themes, an approach is used which is similar to that followed by Parikh et al., in *Relative attributes*, ICCV (2011), 503-510. Each theme was labeled based on representative words from each of its topics. The labels given for the themes present in the community's posts were: *Racism, Women's Rights, LGBT, Politics, Health care, Sexual Identity, Terrorism, and Church*. The labels given for the themes covering community members' stated interest were: *Outdoor Activities, TV Shows, Computer Science Themes, School Subjects, Fiction, Musical Artists, Gender Inequality, Asian Culture, Felines, and the Holocaust*.

EXPERIMENTS

In this section, we use our framework to conduct experiments using Ontd_political data, with the goal of studying stated and manifested interest expressions in the community setting.

Experiment 1: Community Themes and Gap Analysis

The authors compared the amount of tags the community members used to state an interest for a theme with the amount of posts and comments created for each theme. The example framework was used to identify the interest tags relevant to the themes in the community's posts; the percentage of related interest tags and the percentage of posts and comments were calculated per theme and then results were compared.

Following the procedure described in the foregoing section labeled "Thematic Augmented Interests," the example framework categorized stated interest tags, posts and comments of Ontd_political into common themes. Through the framework, it was found that only 21% of the community's interest tags (approximately 8,241 tags) are relevant to the themes covered in the posts. There are evident distinctions between the amount of unique interest tags the community uses for each theme. There are differences between the themes the community created the most posts/comments and the themes the community used the most interest tags. Experiments with the Ontd_political community identified that:

(a) There are themes for which the community will engage in using many different tags to state an interest, while moderately posting or commenting about the theme.

(b) There are themes for which the community may use few interest tags to state an interest, but they will be actively posting and commenting about the theme in the community.

(c) There are themes for which the community generates a proportional amount of interest tags and posts and comments.

Overall, this experiment showed that there is a gap between how community members state and manifest their interests. There are themes for which they will use many different tags to state an affiliation, yet for others while they use many fewer interest tags, they create a much larger amount of posts and comments.

Experiment 2: Impedance Mismatch

In this experiment, the number of users who stated an interest for a theme in their profile and the number of users who posted and commented about the theme in the community were measured. Variations in this phenomenon are referred to as "Impedance Mismatch." In this experiment, the relationships and dynamics of these measurements were analyzed. Per theme, the percentage of unique users who have at least one interest tag relevant to a theme, the percentage of unique users who posted at least once about the theme and the percentage of unique users who commented at least once on a post about the theme were identified.

In this experiment it should be noted that all themes had approximately the same number of users who stated an interest for the theme, but the number of users who manifested an interest for a theme varied among themes.

The main interest dynamics identified through this experiment were: (a) there are themes for which the majority of the community has stated an interest; (b) there are themes that, while a great portion of the community has stated to be interested in them, community members will use few different tags to state such interest; (c) there are themes that a great portion of the community has stated to be interested in them and uses many different tags to state such interest. Results from this experiment highlighted the difference between stated and manifested interests in the community.

Experiment 3: Playback Experiment

The goal of this experiment was to study the community's forms of expressing their manifested thematic interests through time. This allowed the study of the temporal dynamics involved with manifested interests. The community's posts were divided into three one-month time windows. Per time-window and per theme, the amount of posts created were measured. The temporal quantification was compared between each other and with the stated interests of community members. Results of this experiment shows that the interest a community manifests for a particular theme varies over time. The community also tended to manifest more interest for one particular theme every month.

Community interaction playback analysis over the studied time frame contrasted theme popularity. Observed behavior suggested that the community focused on particular themes per time period. It is likely that the manifested interests of the Ontd_political community are likely to be event driven, explaining why the overall manifested interests of the community fluxes in time. However, there were some exception showing that the community generated consistently a similar amount of posts for some themes over time.

This experiment showed that two types of thematic posting behavior exists in Ontd_political: sporadic posting (suggesting a correlation to world events) and periodic posting. The results suggest that the posting behavior associated to a theme could be predicted by analyzing the stated and manifested interests of the theme's main contributors. It seems that in the Ontd_political community when the main contributors of a theme have an alignment between their stated and manifested interests, the theme will appear regularly.

Experiment 4: Burstiness

The goal of this experiment was to profile the daily posting patterns that exist for the four most popular themes on Ontd_political. These four themes were analyzed because these themes are driving the majority of the content shared in the community. It was observed, that for some themes, posts are generated in bursts.

Relating the results from Experiment 3, the authors conclude that the community will post frequently about a theme when the manifested and stated interests of the theme's main contributors are aligned. It is possible that for some themes, that users' posting behavior for these themes is likely not event-driven, but rather based on a persistent interest. Some themes present a mixture of posting behavior, because only a portion of its main contributors also have a great stated interest for the theme. This experiment confirms that two types of posting behaviors are present in the Ontd_political community: sporadic and constant. Sporadic posting appears to generate a larger post turnout.

Interests manifested through posting were compared to those of commenting, focusing primarily on the time of day in which posts and comments were created. It was observed that the users that are posting new content in the community follow a different schedule than the users that comment on the content. Interests manifested through comments appear to be different in nature than interests manifested through posting.

These temporal differences show that users on Ontd_political follow two different behaviors when creating posts and when creating comments. Considering that the community is mainly addressing U.S. politics, and the majority of the users self-report being in the U.S., it is possible that the role of the user posting might be more related to searching for new content and being first to post. This is why an early morning schedule was observed. This experiment shows insights that community members follow different social behaviors for manifesting an interest through posts than when manifesting an interest through comments.

Experiment 5: Typecasting

The goal of this experiment is to group users based on their patterns for stating and manifesting their interests, and profile general traits of the group members. This experiment results in a typecast of the social behaviors encountered in the Ontd_political community for expressing interests.

To accomplish this task, users were grouped based on how aligned their stated and manifested interests have been through time. Per group the different traits of the users in the group were quantified and analyzed, such as the average number of different themes they posted per time window, similarities and differences of their stated and manifested interests, among other related traits.

Two main groups were considered. Group A: users whose stated interests are similar to their manifested interests; and Group B: users whose stated interests are different to their manifested interests.

The example framework is used to calculate the user's degree of stated and manifested interest for each theme via Equation 2. For each user, two interest vectors per month are created. One denotes the user's degree of stated interest for the themes and the other denotes the user's degree of manifested interest for the themes based on posts the user created in that month. Interest similarity among these vectors is measured via a similarity metric. The user's average interest similarity for all months was obtained. When a user's average is above a threshold M, the user is labeled as belonging to Group A. For any other case the user labeled as belonging to Group B. The similarity metric of the Dot-Product, and M=0, is used, i.e., users are grouped in A when they have at least, one stated interest relevant to at least one of their posts.

Once users are classified into the groups, the general traits of the group members are analyzed. The average number of themes the group members' posts covered is measured. Then per month, the group's top 3 most popular themes are identified and compared with most popular themes in the community at the time. The overlap between group members' stated and manifested interest is compared.

Figure 13:
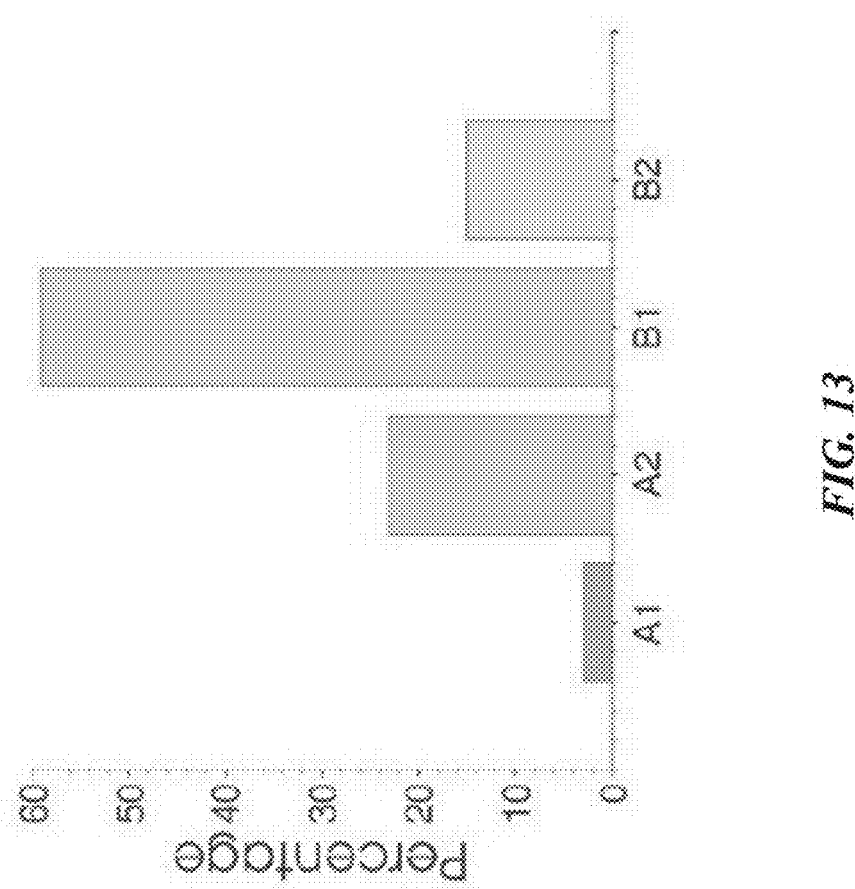
FIG. 13 represents the percentage of community members belonging to each group type, according to an experiment of one embodiment.

FIG. 13 represents the percentage of community members belonging to each group type, according to the experiment. It was observed that the majority of community members belong to type B1: users with stated interests relevant to the themes posted about in the community, but they never manifesting an interest for such themes in the community.

In general, users seem to cluster into three different behavior patterns:

Group A: Users from this group are users whose stated interest tags have some relevancy to the themes of their posts. 26% of all users posting to the community (aka, "Posters") belong to this group. We find that within this group two different types of expression for manifesting and stating interests exist:

Group A-1: Around 3% of all Posters belong to this subgroup. The users of this sub-group while they state an interest for many themes and cover all of these themes in their posts, also create posts about themes not stated in their profile. On average per month these users post about 4-5 different themes. Only one of these themes tends to be among the top three most popular themes in the community at the time. The users that cover the most themes, cover up to 8 different themes per month.

Group A-2: Around 23% of all Posters belong to this subgroup. The users of this sub-group cover in their posts all of the themes they stated an interest for in their profile, and they never post about themes they have not stated an interest for previously. On average per month these users post only about one theme, and it usually is not among the top three most popular themes in the community at the time. The users that cover the most themes in their posts, cover only up to three different themes.

Group B: Users from this group are users whose stated interest tags have no relevancy to the themes of their posts. 74% of all Posters belong to this group. Within this group two different types of expression for manifesting and stating interests exist:

Group B-1: Around 59% of all Posters belong to this group. The users of this sub-group have stated interests relevant to the themes covered in the posts of Ontd_political, but these users never post anything related to these particular themes.

Group B-2: Around 15% of all Posters belong to this group. These users have no stated interests relevant to the themes covered in the posts of Ontd_political.

Users in group B-1 and B-2 follow the same traits: per month, the users of group B post on average only about one theme and the theme is always among the top three most popular themes in the community at the time. The users that cover the most themes in their posts, cover up to 8 different themes.

This experiment shows that community members have invested time in stating their interests in their profile, about a quarter of the community members have kept their stated interests up-to-date with their posts. The majority of users who cover the most popular themes in the community, have not stated an affiliation or interest for such themes in their profile. There can be several explanations to this behavior, it is unclear exactly why it is observed. One possibility is that their posting is more event driven, and there is therefore no need to state such an interest in their profile; another possibility is that these users are discussing sensitive topics and as such they might not want to put that as an interest in their profile.

This experiment reaffirms that theme popularity is not necessarily attributed to having contributors whose profile statements match their online behavior, which implies that profile augmentation may be in order. It was observed that for some cases the stated interests of users' are a perfect mirror to their manifested interests, but for others their stated interests fall short of covering all of the themes they post about in a community.

DISCUSSION

Theoretical Implications

Through a case study around users' interests the authors have demonstrated how by measuring the similarities and differences between statements users make in their online profile and their behavior in social media, the practices of its members can characterized and behavior of online communities better understood. The foregoing experiments identified that the majority of the Posters in Ontd_political do not tend to post about themes stated in their personal interests, although, community members would actively comment about things stated in their personal interests. Further, themes appeared to have expression norms associated to them, which influenced the number of interest tags used, frequency of posting and amount of posts the community generated at a given time.

These findings show promise that the system and methods described herein may be used on larger populations of online communities. Analysis of social roles and personas, as described herein may also be helpful for community newcomers that seek to understand the social norms of the online community. Embodiments, may provide information to the end-user to show how the stated and manifested interests of community members are typically presented. Analysis of the above experiments also discovered some patterns related to theme popularity. One patter was that the number of unique users posting about a theme appeared to influence the theme's popularity in the community. This finding shows that embodiments as described herein may be used for helping social media designers identify the key variables for generating high traffic in different online communities.

Limitations

It is acknowledged that some methods used for modeling users' interests via topic modeling and semantic techniques may capture interest for a particular topic, but they do not cover all of the playfulness, or sarcastic undertones that users can express when stating and manifesting an interest online. There continue to be more advances in natural language processing and understand, and these limitations may lessen over time.

CONCLUSION

Embodiments of the example framework may enable many novel user interactions, such as systems that, allow users introspection on the type of interests they are pushing or have pushed about themselves, and also analyze how their behavior mirrors or diverts from the statements of themselves they have made. The framework also enables the creation of systems that can help users achieve their desired online image, or social persona. For such systems, the end-user would simply indicate which online community member they wished to resemble and the system could guide the user as to what behaviors and what statements to make to accomplish such goal. The system could also alert the user when in her online interactions, she was derailing from the image she sought to portray. The framework may also be used to quantify the typical ways users express their online interests within a particular online community. Such information may be extremely important for facilitating the newcomers socialization process, as newcomers would have a better understanding of the community's expected self-disclosure processes. The framework may also be used to help users find communities with members that expressed their online interests similar to them, or in a form the end-user felt comfortable with.

Quantifying how users express their online interests is not only important for offering better user interactions and systems, it is also important as the Internet has made it possible for users to shape minds and even change world outcomes, while remaining relatively anonymous. It is therefore important to understand the motivations, interests and social persona of the users who push certain type of content. This type of quantification also helps foster an environment of constructive discussions. Certain users may play a key role, either due to their expertise and interest in a certain topic, or because of a behavior they bring to the table that could act as a catalyst As large Internet players begin to analyze the sort of social recommendations that should be provided to users and to communities based on stated interests and online behavior, it becomes extremely important to provide tools that can model and quantify how the stated and manifested interests of users appear in the wild; providing a better understanding of the role they play in the community's discussions.

ADDITIONAL NOTES AND EXAMPLES

Example embodiments may include subject matter such as a system or apparatus, method, means for performing acts, and at least one machine-readable medium including instructions that, when performed by a machine cause the machine to performs acts.

Example 1 is a system for managing online communities, including a server to host an online community persona manager; a crawling module coupled to the persona manager, the crawling module configured to collect information from at least one online source that is viewable by a plurality of users, and to collect user profile information contributed by at least one user; a social inference module coupled to the persona manager, the social inference module configured to automatically detect and classify social roles of the plurality of users of the online community, wherein the social inference module utilizes information collected by the crawling module; and a social recommendation module coupled to the persona manager, and configured to receive classification information from the social inference module, the social recommendation module further configured to send at least one suggestion to at least one user of the online community, wherein the at least one suggestion includes at least one of (i) suggesting information about a user to add to the profile of the user, (ii) suggesting an online conversations for the user to join, based an assumed social role of the user and/or a social roles identified as needed for the online community, (iii) suggesting a conversation to join to enable the user to fulfill a desired social goal, and (iv) sending an alert to the user when the user behavior is deemed to positively or negatively affect the user to achieve one of or more social goal.

Example 2 includes the subject matter of example 1, wherein the social recommendation module further comprises: a profile augmentation recommendation module configured to determine a user's manifested topics of interest based on the user's behavior, determine a user's stated topics of interest primarily based on the user's profile information, and then provide a mapping between the user's manifested topics of interest and stated topics of interest, wherein the profile augmentation module is further configured to recommend adding one or more topics of interest to the user's profile based on the mapping and current profile; an online conversation recommendation module configured to identify live conversations within the online community and corresponding social roles of users corresponding to the live conversations, and further to make conversation suggestions to users, based on at least one of a determined social role lacking in a conversation or online community, a determined user social role, and a user desired social goal; and a social goal alert module configured to send behavioral alerts to users.

Example 3 includes the subject matter of any of examples 1 or 2, wherein the social roles include at least one of Maven, Newbie, Troll, and/or Moderator.

Example 4 includes the subject matter of example 2, wherein the profile augmentation recommendation module is further configured to identify stated topics of interest and measure a level of similarity between different groups of words or posts in a conversation within the online community to determine the manifested topics of interest of the community, and provide a mapping between the stated topics of interest and the manifested topics of interest.

Example 5 may include the subject matter of any of examples 1-4 and further includes: a social persona visualization module coupled to the persona manager, the social persona visualization module configured to provide an interactive visual representation of at least one user's online persona and present data which contributes to the persona.

Example 6 includes the subject matter of example 5, wherein the social persona visualization module allows a user to edit their online content and view how the user's persona is affected by the editing.

Example 7 is a method for managing personas in an online community, including: collecting information from at least one online community; collecting profile information for users of the at least one online community; automatically detecting and classifying social roles of users of the at least one online community utilizing the collected information; automatically detecting the stated and manifested interests of community members; and sending at least one suggestion to at least one user of the at least one online community, wherein the at least one suggestion includes at least one of (i) suggesting information about a user to add to the profile of the user, (ii) suggesting an online conversations for the user to join, based an assumed social role of the user and/or a social roles identified as needed for the online community, (iii) suggesting a conversation to join to enable the user to fulfill a desired social goal, and (iv) sending an alert to the user when the user behavior is deemed to positively or negatively affect the user to achieve one of or more social goal.

Example 8 includes the subject matter of example 7 and further includes: mapping manifested topics of interest for a user to stated topics of interest; recommending to the user to add to their profile the manifested topics of interest currently not in their preferred stated topics of interest; identifying live conversations within the online community and corresponding social roles of users corresponding to the live conversations; providing conversation suggestions to users, based on at least one of a determined social role lacking in a conversation or online community, a determined user social role, and a user desired social goal; and sending behavioral alerts to users.

Example 9 includes the subject matter of any of examples 7-8, wherein the social roles include at least one of Maven, Newbie, Troll, and/or Moderator.

Example 10 includes the subject matter of any of examples 7-9, and further includes: identifying stated topics of interest of the community from tags in users' profiles; measuring a level of similarity between different groups of words in posts and/or comments of the online community; identifying manifested topics of interest of the community members using the different groups of words; and providing a mapping between the manifested topics of interests to the stated topics of interest, based on their word similarity.

Example 11 includes the subject matter of any of examples 7-10, and further includes: providing an interactive visual representation of at least one user's online persona; and presenting data which contributes to the persona.

Example 12 includes the subject matter of any of examples 7-11, and further includes: allowing a user to edit their online content, and view how the social persona is affected by the editing.

Example 13 is at least one computer readable storage medium having instructions stored thereon, the instructions when executed on a machine cause the machine to perform the method of any of the aforementioned examples 7-12.

Example 14 is an apparatus configured to perform the method of any of the aforementioned examples 7-12.

Example 15 is a system for managing online personas, and optionally includes any of: means for collecting information about posts and conversations in an online community; means for collecting user profile information; means for analyzing the collected information to determine users' roles within the online community; means for identifying needs of the online community with respect to at least one conversation within the online community; means for identifying needs of at least one user of the online community based at least on the user's desired goals and the user's determine role(s) within the online community; means for providing suggestions to the at least one user, the suggestion being related to roles and conversations within the online community; and means for providing behavioral alerts to users of the online community.

Example 16 includes the subject matter of example 15, to include or omit optional features, and further includes: means for presenting an interactive visual representation of at least one social persona to the user, and optionally wherein the means for presenting a visual online persona is to allow the user to edit their online content and view how the user's social persona is affected by the editing.

Example 17 is a framework for managing personas and roles in an online community where a persona management engine collects and analyzes information about current and past conversations, comments or posts within an online community, assigns pre-defined roles to users based on their activity in the conversations, comments or posts, and alerts members of the community to the community needs and/or alerts users regarding their roles or goals, and optionally sends behavioral alerts to users. The framework may optionally provide an interactive visualization interface to allow users to view a representation of social personas of one of more users, based on past and present activity within the online community. The framework may also optionally allow users to edit their online content (past activity posted online) to alter their social personas within the community. The framework may include or omit any of the features included in examples 1-16.

The techniques described herein are not limited to any particular hardware or software configuration; they may find applicability in any computing, consumer electronics, or processing environment. The techniques may be implemented in hardware, software, firmware or a combination.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For simulations, program code may represent hardware using a hardware description language or another functional description language which essentially provides a model of how designed hardware is expected to perform. Program code may be assembly or machine language, or data that may be compiled in advance or during execution and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible, also referred to as computer readable, medium having stored thereon instructions that may be used to program a processing system or other electronic device to perform the methods. While a machine-accessible medium may be illustrated as a single medium, the terms "machine accessible medium," or "computer readable medium" may include a single medium or multiple media (e.g., a centralized or distributed database, and/or associated caches and servers) that configured to store the one or more instructions. Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine accessible medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, tablets, laptops, desktop computers or hybrids, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments, cloud services, or ad hoc peer to peer networks where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

While the subject matter herein has been described with reference to illustrative embodiments and examples, this description is not intended to be construed in a limiting sense. Various modifications of the illustrative embodiments, as well as other embodiments which are apparent to persons skilled in the art are deemed to lie within the scope of the appended claims.

The above description is intended to be illustrative, and not restrictive. For example, the above-described examples (or one or more aspects thereof) may be used in combination with each other. Other embodiments may be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the claimed subject matter be determined with reference to the appended claims, along with the full scope of equivalents to which such claims are entitled.

What is claimed is:

1. A server for managing online communities, the server comprising:
   a processor;
   a memory coupled to the processor;
   an online community persona manager stored in the memory and executable by the processor;
   a crawling module stored in the memory and executable by the processor the crawling module configured to collect information from at least one online source that is viewable by a plurality of users, and to collect user profile information contributed by a user;
   a social inference module stored in the memory and executable by the processor, the social inference module configured to automatically classify social roles of the plurality of users of the online community, wherein the social inference module utilizes information collected by the crawling module; and
   a social recommendation module stored in the memory and executable by the processor, the social recommendation module configured to: (i) receive classification information from the social inference module, (ii) determine a user's manifested topics of interest based on the user's behavior, (iii) determine a user's stated topics of interest primarily based on the user's profile information, (iv) provide a mapping between the user's manifested topics of interest and stated topics of interest, (v) recommend adding one or more topics of interest to the user's profile based on the mapping and current profile, (vi) identify live conversations within the online community and corresponding social roles of users corresponding to the live conversations, (vii) send at least one suggestion to the user, wherein the at least one suggestion includes a suggestion of an online conversation for the user to join, based on an assumed social role of the user and/or a social roles identified as needed for the online community, and (viii) send behavioral alerts to users.

2. The server as recited in claim 1, wherein the social roles include at least one of Maven, Newbie, Troll, and Moderator.

3. The server as recited in claim 1, wherein the profile augmentation recommendation module is further configured to identify stated topics of interest and measure a level of similarity between different groups of words or posts in a conversation within the online community to determine the manifested topics of interest of the community, and provide a mapping between the stated topics of interest and the manifested topics of interest.

4. The server as recited in claim 1, further comprising:
   a social persona visualization module, stored in the memory and executable by the processor, the social persona visualization module configured to provide an interactive visual representation of at least one user's online persona and present data which contributes to the persona.

5. The server as recited in claim 4, wherein the social persona visualization module allows a user to edit their online content and view how the user's persona is affected by the editing.

6. A method for managing personas in an online community, comprising:
   collecting information from at least one online community;
   collecting profile information for users of the at least one online community;
   automatically detecting and classifying social roles of users of the at least one online community utilizing the collected information;
   automatically detecting the stated and manifested interests of community members;
   mapping manifested topics of interest for a user to stated topics of interest;
   recommending to the user to add to their profile the manifested topics of interest currently not in their preferred stated topics of interest;
   identifying live conversations within the online community and corresponding social roles of users corresponding to the live conversations;
   sending at least one suggestion to the user of the at least one online community, wherein the at least one suggestion includes a suggestion of an online conversation for the user to join, based on an assumed social role of the user and/or a social roles identified as needed for the online community; and
   sending behavioral alerts to users.

7. The method as recited in claim 6, wherein the social roles include at least one of Maven, Newbie, Troll, Moderator.

8. The method as recited in claim 6, further comprising:
identifying stated topics of interest of the community from tags in users' profiles;
measuring a level of similarity between different groups of words in posts and/or comments of the online community;
identifying manifested topics of interest of the community members using the different groups of words; and
providing a mapping between the manifested topics of interests to the stated topics of interest, based on their word similarity.

9. The method as recited in claim 6, further comprising:
providing an interactive visual representation of at least one user's online persona; and
presenting data which contributes to the persona.

10. The method as recited in claim 9, further comprising:
allowing a user to edit their online content and view how the user's social persona is affected by the editing.

11. At least one non-transitory, computer readable storage medium having instructions stored thereon, the instructions when executed on a machine cause the machine to:
collect information from at least one online community;
collect profile information for users of the at least one online community;
automatically detect and classify social roles of users of the at least one online community utilizing the collected information;
automatically detect the stated and manifested interests of community members;
map manifested topics of interest for a user to stated topics of interest;
recommend to the user to add to their profile the manifested topics of interest currently not in their preferred stated topics of interest;
identify live conversations within the online community and corresponding social roles of users corresponding to the live conversations;
send at least one suggestion to the user of the at least one online community, wherein the at least one suggestion includes a suggestion of an online conversation for the user to join, based on an assumed social role of the user and/or a social roles identified as needed for the online community; and
send behavioral alerts to users.

12. The non-transitory, medium as recited in claim 11, wherein the social roles include at least one of Maven, Newbie, Troll, and Moderator.

13. The non-transitory, medium as recited in claim 11, further comprising instructions to:
identify stated topics of interest of the community from tags in users' profiles;
measure a level of similarity between different groups of words in posts and/or comments of the online community;
identify manifested topics of interest of the community members using the different groups of words; and
provide a mapping between the manifested topics of interests to the stated topics of interest, based on their word similarity.

14. The non-transitory, medium as recited in claim 11, further comprising instructions to:
provide an interactive visual representation of at least one user's online persona; and
present data which contributes to the online persona.

15. The non-transitory, medium as recited in claim 14, further comprising instructions to:
allow a user to edit their online content and view how the user's social persona is affected by the editing.

16. A system for managing online personas, comprising:
means for collecting information about posts and conversations in an online community;
means for collecting user profile information;
means for analyzing the collected information to determine users' roles within the online community;
means for automatically detecting the stated and manifested interests of community members;
means for mapping manifested topics of interest for a user to stated topics of interest;
means for recommending to the user to add to their profile the manifested topics of interest currently not in their preferred stated topics of interest;
means for identifying live conversations within the online community and corresponding social roles of users corresponding to the live conversations;
means for providing suggestions to the user, the suggestion including a suggestion of an online conversation for the user to join, based on an assumed social role of the user and/or a social roles identified as needed for the online community; and
means for providing behavioral alerts to users of the online community.

17. The system as recited in claim 16, further comprising:
means for presenting an interactive of at least one social persona to the user, wherein the means for presenting a visual social persona is configured to allow the user to edit their online content and view how the social persona is affected by the editing.

* * * * *